(12) United States Patent
Sengupta et al.

(10) Patent No.: US 11,121,902 B2
(45) Date of Patent: Sep. 14, 2021

(54) SIGNAL GENERATION FOR OFDM-BASED SYSTEMS

(71) Applicant: QUALCOMM Incorporated, San Diego, CA (US)

(72) Inventors: Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/372,378

(22) Filed: Apr. 1, 2019

(65) Prior Publication Data

US 2019/0312766 A1    Oct. 10, 2019

Related U.S. Application Data

(60) Provisional application No. 62/653,166, filed on Apr. 5, 2018.

(51) Int. Cl.
*H04L 27/26* (2006.01)

(52) U.S. Cl.
CPC ...... *H04L 27/2637* (2013.01); *H04L 27/2628* (2013.01)

(58) Field of Classification Search
CPC .......... H04L 27/2637; H04L 27/2628
See application file for complete search history.

(56) References Cited

U.S. PATENT DOCUMENTS

2018/0167175 A1*   6/2018   Al-Dweik ............... H04L 25/02

OTHER PUBLICATIONS

Ericsson ("Narrowband LTE—Synchronization Channel Design and Performance," 3GPP TSG-RAN1 #82bits, 3GPP Draft, R1-156009, Malmo, Sweden, Sep. 30, 2015) (Year: 2015).*

(Continued)

*Primary Examiner* — Jamal Javaid
(74) *Attorney, Agent, or Firm* — Holland & Hart LLP

(57) ABSTRACT

Methods, systems, and devices for wireless communications are described. A transmitting device may identify a first signal in a time domain, the first signal including multiple sequences spanning a bandwidth for multiple symbol periods. The transmitting device may segment the first signal into signal segments, where each signal segment corresponds to a respective symbol period of the multiple symbol periods. The transmitting device may apply a first transform operation to each signal segment of the signal segments and apply a bandwidth restriction in the frequency domain to the transformed signal segments. Then, the transmitting device may apply a second transform operation to each transformed signal segment to return the bandwidth-restricted segments to the time domain. The transmitting device may generate a second signal in the time domain based on the bandwidth-restricted segments. The transmitting device may then transmit the second signal to a receiving device.

30 Claims, 15 Drawing Sheets

(56) References Cited

OTHER PUBLICATIONS

Ericsson: "Narrowband LTE—Synchronization Channel Design and Performance", 3GPP TSG-RAN1 #82bits, 3GPP Draft, R1-156009—Narrowband LTE—Synchronization Channel Design and Performance, 3rd Generation Partnership Project (3GPP), Mobile Competence Centre, 650, Route Des Lucioles, F-06921 Sophia, vol. RAN WG1, No. Malmo, Sweden, Oct. 5, 2015-Oct. 10, 2015, Sep. 30, 2015, pp. 1-31, XP051041885, Retrieved from the Internet: URL: http://www.3gpp.org/ftp/tsg_ran/WG1_RL1/TSGR1_82b/Docs/ [retrieved on Sep. 30, 2015], Section 3.1; figure 4, Section 3.2; figure 5.
International Search Report and Written Opinion—PCT/US2019/025386—ISA/EPO—dated Jun. 24, 2019.
Matsuura T., et al., "Improved Algorithms for Cancellation Carrier Optimization to Suppress the OFDM OOB Spectrum", IEEE Communications Letters, IEEE Service Center, Piscataway, NJ, US, vol. 13, No. 2, Feb. 1, 2009 (Feb. 1, 2009), pp. 112-114, XP011267504, ISSN: 1089-7798, DOI: 10.1109/LCOMM.2009.081652, Sections II. and III.
ZTE: "Remaining Issues on PSS and SSS for NB-IoT", 3GPP TSG RAN WG1 NB-IoT Ad-Hoc Meeting, 3GPP Draft; R1-161993 NB-PSS and SSS_Updated, 3rd Generation Partnership Project (3GPP), Mobile Competence Centre; 650, Route Des Lucioles; F-06921 Sophia-Antipolis Cedex; France, vol. RAN WG1, No. Sophia; Mar. 22, 2016-Mar. 24, 2016, Mar. 22, 2016 (Mar. 22, 2016), 6 Pages, XP051081100, Retrieved from the Internet URL: http://www.3gpp.org/ftp/tsg_ran/WG1_RL1/TSGR1_AH/LTE_NB-IoT_1603/Docs/ [retrieved on Mar. 22, 2016] Sections 2. and 3.

\* cited by examiner

SIGNAL GENERATION FOR OFDM-BASED SYSTEMS

CROSS REFERENCES

The present Application for Patent claims the benefit of U.S. Provisional Patent Application No. 62/653,166 by Sengupta et al., entitled "Signal Generation For OFDM-Based Systems," filed Apr. 5, 2018, assigned to the assignee hereof, and expressly incorporated by reference in its entirety herein.

BACKGROUND

The following relates generally to wireless communications, and more specifically to signal generation for orthogonal frequency division multiplexing (OFDM)-based systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE and a base station may establish and execute OFDM communications. The base station may transmit a series of sequences to the UE, for example, for the UE to synchronize with the base station. The base station may generate a signal including multiple sequences spanning multiple symbol periods. In some cases, the base station may utilize long sequences, which may span multiple symbol periods and may have a length that is a non-integer number of symbol periods. The base station, however, may be unable to specify the signal in the frequency domain in some cases based on characteristics of the signal (e.g., if a sequence in the signal occupies a non-integer number of symbol periods). Improved techniques for OFDM communications are desired.

SUMMARY

The described techniques relate to improved methods, systems, devices, or apparatuses that support orthogonal frequency division multiplexing (OFDM)-based systems. A wireless device, such as a base station or a user equipment (UE), may generate a band-limited, time domain signal including multiple time-domain sequences spanning multiple symbol periods. The sequences may be long sequences, for example longer than one symbol period, and each may occupy a number of symbol periods (e.g., a non-integer number of symbol periods). In some cases, the wireless device (e.g., a transmitting wireless device) may be unable to specify the signal in the frequency domain based on the sequences occupying a number of symbol periods (e.g., a non-integer number of symbol periods).

To provide certain advantages and address drawbacks of other techniques and methods, the wireless device may generate an approximated (e.g., second) signal (e.g., OFDM signal) based on an original (e.g., first) signal. The transmitting wireless device may, in some cases, specify each symbol period of the approximated signal in the frequency domain. The transmitting wireless device may generate the approximated signal by dividing the signal into segments (e.g., symbol period-sized segments) of samples. A length of a segment (e.g., the number of samples for that segment) may be based on a size of a symbol period, which may in some cases be related to a cyclic prefix length specific to that symbol period.

In some examples, the wireless device may restrict the bandwidth of the segments to the bandwidth of the original, band-limited signal. For example, the transmitting wireless device may apply a fast Fourier transform (FFT) to each segment and zero out any non-zero frequency components which are outside of the set bandwidth. In another example, the transmitting wireless device may take a minimum mean square error (MMSE) estimate of a segment, which may identify the non-zero frequency components within the set bandwidth. The wireless device may append (e.g., pad) certain information to the MMSE estimate coefficients (e.g., pad the MMSE coefficients with placeholder information, such as one or zeros or other information) to obtain bandwidth-restricted segments. The wireless device may apply an inverse FFT (IFFT) to the bandwidth-restricted segments to return the segments to the time domain, which may be desirable in some cases based on certain constraints. The wireless device may append some information (e.g., a number of the last samples of the IFFT output) to a part of (e.g., a beginning of) the bandwidth-restricted segments (e.g., as a cyclic prefix). The wireless device may then generate a second signal (e.g., that approximates the first signal) by combining and placing the appended and bandwidth-restricted segments (e.g., sequentially) for each symbol period. In some cases, a second device (e.g., a receiving device) may be configured with the original, repeated sequence, and the receiving device may perform cross-correlation with the original sequence and the sequences in the approximated signal in an effort to better implement related methods and techniques, including improving accuracy.

A method of wireless communications is described. The method may include identifying, at a first wireless device, a first signal in a time domain, the first signal including a set of sequences spanning a bandwidth for a set of symbol periods, segmenting the first signal into a set of signal segments where each signal segment corresponds to a respective symbol period of the set of symbol periods, applying a first transform operation to each signal segment of the set of signal segments to obtain a set of transformed signal segments, applying a second transform operation different from the first transform operation to each transformed signal segment to obtain a set of output signal segments, generating a second signal in the time domain based on obtaining the set of the output signal segments, and transmitting the second signal to a second wireless device.

An apparatus for wireless communications is described. The apparatus may include a processor, memory in electronic communication with the processor, and instructions stored in the memory. The instructions may be executable by the processor to cause the apparatus to identifying, at a first wireless device, a first signal in a time domain, the first signal including a set of sequences spanning a bandwidth for a set of symbol periods, segmenting the first signal into a set of signal segments, where each signal segment corresponds to a respective symbol period of the set of symbol periods, applying a first transform operation to each signal segment of the set of signal segments to obtain a set of transformed signal segments, applying a second transform operation different from the first transform operation to each transformed signal segment to obtain a set of output signal segments, generating a second signal in the time domain based on obtaining the set of the output signal segments, and transmitting the second signal to a second wireless device.

Another apparatus for wireless communications is described. The apparatus may include identifying, at a first wireless device, a first signal in a time domain, the first signal including a set of sequences spanning a bandwidth for a set of symbol periods, segmenting the first signal into a set of signal segments, where each signal segment corresponds to a respective symbol period of the set of symbol periods, applying a first transform operation to each signal segment of the set of signal segments to obtain a set of transformed signal segments, applying a second transform operation different from the first transform operation to each transformed signal segment to obtain a set of output signal segments, generating a second signal in the time domain based on obtaining the set of the output signal segments, and transmitting the second signal to a second wireless device.

A non-transitory computer-readable medium storing code for wireless communications is described. The code may include instructions executable by a processor to identifying, at a first wireless device, a first signal in a time domain, the first signal including a set of sequences spanning a bandwidth for a set of symbol periods, segmenting the first signal into a set of signal segments, where each signal segment corresponds to a respective symbol period of the set of symbol periods, applying a first transform operation to each signal segment of the set of signal segments to obtain a set of transformed signal segments, applying a second transform operation different from the first transform operation to each transformed signal segment to obtain a set of output signal segments, generating a second signal in the time domain based on obtaining the set of the output signal segments, and transmitting the second signal to a second wireless device.

Some examples of the method, apparatuses, and non-transitory computer-readable medium described herein may further include operations, features, means, or instructions for determining frequency components for a transformed signal segment of the set of transformed signal segments and setting a value for the frequency components outside of the bandwidth to a predetermined value, where applying the second transform operation may be based on setting the value for the frequency components.

In some examples of the method, apparatuses, and non-transitory computer-readable medium described herein, applying the first transform operation may include operations, features, means, or instructions for applying an FFT operation to at least one signal segment of the set of segments based on a length of the respective symbol period corresponding to the at least one signal segment.

Some examples of the method, apparatuses, and non-transitory computer-readable medium described herein may further include operations, features, means, or instructions for determining MMSE estimate coefficients of at least one signal segment of the set of signal segments in the bandwidth, where applying the first transform operation may be based on determining the MMSE estimate coefficients of the at least one signal segment and determining frequency components for at least one transformed signal segment in the bandwidth based on the MMSE estimate coefficients of the at least one signal segment, where applying the second transform operation may be based on determining the frequency components for at least one transformed signal segment.

Some examples of the method, apparatuses, and non-transitory computer-readable medium described herein may further include operations, features, means, or instructions for adding at least one placeholder value to the MMSE estimate coefficients based on a length of the respective symbol period corresponding to the signal segment, where applying the second transform operation may be based on adding the at least one placeholder value.

In some examples of the method, apparatuses, and non-transitory computer-readable medium described herein, determining the MMSE estimate coefficients further may include operations, features, means, or instructions for deriving a set of frequency components corresponding to the bandwidth using a preconfigured matrix that may be based on the bandwidth and a length of the symbol period.

In some examples of the method, apparatuses, and non-transitory computer-readable medium described herein, applying the second transform operation may include operations, features, means, or instructions for applying an IFFT operation to at least one transformed signal segment based on a length of the symbol period corresponding to the at least one transformed signal segment.

Some examples of the method, apparatuses, and non-transitory computer-readable medium described herein may further include operations, features, means, or instructions for appending at least a portion of at least one cyclic prefix to at least one output signal segment of the set of output signal segments.

In some examples of the method, apparatuses, and non-transitory computer-readable medium described herein, a first length of a first cyclic prefix for a first output signal segment may be different than a second length of a second cyclic prefix for a second output signal segment, and where appending the at least a portion of the at least one cyclic prefix to the at least one output signal segment of the set of output signal segments may include operations, features, means, or instructions for appending a portion of the first cyclic prefix having the first length to the first output signal segment of the set of output signal segments and a portion of the second cyclic prefix having the second length to the second output signal segment of the set of output signal segments.

In some examples of the method, apparatuses, and non-transitory computer-readable medium described herein, generating the second signal in the time domain further may include operations, features, means, or instructions for combining the set of output signal segments using a sequential ordering of the set of output signal segments that approximates the first signal using the set of output signal segments.

Some examples of the method, apparatuses, and non-transitory computer-readable medium described herein may further include operations, features, means, or instructions for determining a set of samples for each signal segment based on a subcarrier spacing and a base sampling frequency, where applying the first transform operation and the second transform operation may be based on the set of samples.

In some examples of the method, apparatuses, and non-transitory computer-readable medium described herein, a symbol period of the set of symbol periods includes an information period and a cyclic prefix period.

In some examples of the method, apparatuses, and non-transitory computer-readable medium described herein, a length of the information period may be based on a subcarrier spacing and a base sampling frequency.

In some examples of the method, apparatuses, and non-transitory computer-readable medium described herein, the first signal includes a set of zero values at a start of the first signal, where the set of zero values may be based on a number of sequences in the set of sequences and a length of the set of sequences.

In some examples of the method, apparatuses, and non-transitory computer-readable medium described herein, the set of transformed signal segments correspond to a frequency domain, and the set of output signal segments correspond to the time domain.

In some examples of the method, apparatuses, and non-transitory computer-readable medium described herein, the first transform operation may be based on a first matrix including an inverse discrete Fourier transform (DFT) kernel, where an order of the first matrix corresponds to a length of the respective symbol period, a second matrix, where the second matrix may be the first matrix with only a set of columns corresponding to the bandwidth, and an identity matrix, where an order of the identity matrix corresponds to a length of a cyclic prefix of the respective symbol period.

In some examples of the method, apparatuses, and non-transitory computer-readable medium described herein, a sequence of the set of sequences may be a pseudorandom noise sequence or a Zadoff-Chu sequence.

A method of wireless communications is described. The method may include identifying, at a first wireless device, a set of sequences including at least a first sequence, receiving, from a second wireless device, a first signal in a time domain, the first signal including a set of symbols spanning a bandwidth for a set of symbol periods, identifying a first set of samples corresponding to the first sequence in a first symbol period of the set of symbol periods of the first signal, identifying a second set of samples corresponding to the first sequence in a second symbol period subsequent to the first symbol period of the set of symbol periods of the first signal, and combining the first set of samples and the second set of samples to identify at least a portion of a second sequence which approximates the first sequence.

An apparatus for wireless communications is described. The apparatus may include a processor, memory in electronic communication with the processor, and instructions stored in the memory. The instructions may be executable by the processor to cause the apparatus to identifying, at a first wireless device, a set of sequences including at least a first sequence, receiving, from a second wireless device, a first signal in a time domain, the first signal including a set of symbols spanning a bandwidth for a set of symbol periods, identifying a first set of samples corresponding to the first sequence in a first symbol period of the set of symbol periods of the first signal, identifying a second set of samples corresponding to the first sequence in a second symbol period subsequent to the first symbol period of the set of symbol periods of the first signal, and combining the first set of samples and the second set of samples to identify at least a portion of a second sequence which approximates the first sequence.

Another apparatus for wireless communications is described. The apparatus may include identifying, at a first wireless device, a set of sequences including at least a first sequence, receiving, from a second wireless device, a first signal in a time domain, the first signal including a set of symbols spanning a bandwidth for a set of symbol periods, identifying a first set of samples corresponding to the first sequence in a first symbol period of the set of symbol periods of the first signal, identifying a second set of samples corresponding to the first sequence in a second symbol period subsequent to the first symbol period of the set of symbol periods of the first signal, and combining the first set of samples and the second set of samples to identify at least a portion of a second sequence which approximates the first sequence.

A non-transitory computer-readable medium storing code for wireless communications is described. The code may include instructions executable by a processor to identifying, at a first wireless device, a set of sequences including at least a first sequence, receiving, from a second wireless device, a first signal in a time domain, the first signal including a set of symbols spanning a bandwidth for a set of symbol periods, identifying a first set of samples corresponding to the first sequence in a first symbol period of the set of symbol periods of the first signal, identifying a second set of samples corresponding to the first sequence in a second symbol period subsequent to the first symbol period of the set of symbol periods of the first signal, and combining the first set of samples and the second set of samples to identify at least a portion of a second sequence which approximates the first sequence.

Some examples of the method, apparatuses, and non-transitory computer-readable medium described herein may further include operations, features, means, or instructions for identifying the first set of samples based on a cross-correlation of the first set of samples to the first sequence, and identifying the second set of samples based on a cross-correlation of the second set of samples to the first sequence.

In some examples of the method, apparatuses, and non-transitory computer-readable medium described herein, the first sequence may be a pseudorandom noise sequence or a Zadoff-Chu sequence.

Some examples of the method, apparatuses, and non-transitory computer-readable medium described herein may further include operations, features, means, or instructions for identifying an information period and a cyclic prefix period in a symbol period of the set of symbol periods, where the information period includes a first subset of samples and the cyclic prefix period includes a second subset of samples.

Some examples of the method, apparatuses, and non-transitory computer-readable medium described herein may further include operations, features, means, or instructions for identifying a set of zero values at a start of a first symbol of the set of symbols, where the set of zero values may be based on a number of sequences in the set of sequences and a length of the set of sequences.

In some examples of the method, apparatuses, and non-transitory computer-readable medium described herein, the first signal includes non-zero values for frequency components within the bandwidth and zero values for frequency components outside of the bandwidth.

DETAILED DESCRIPTION

Figure 1:
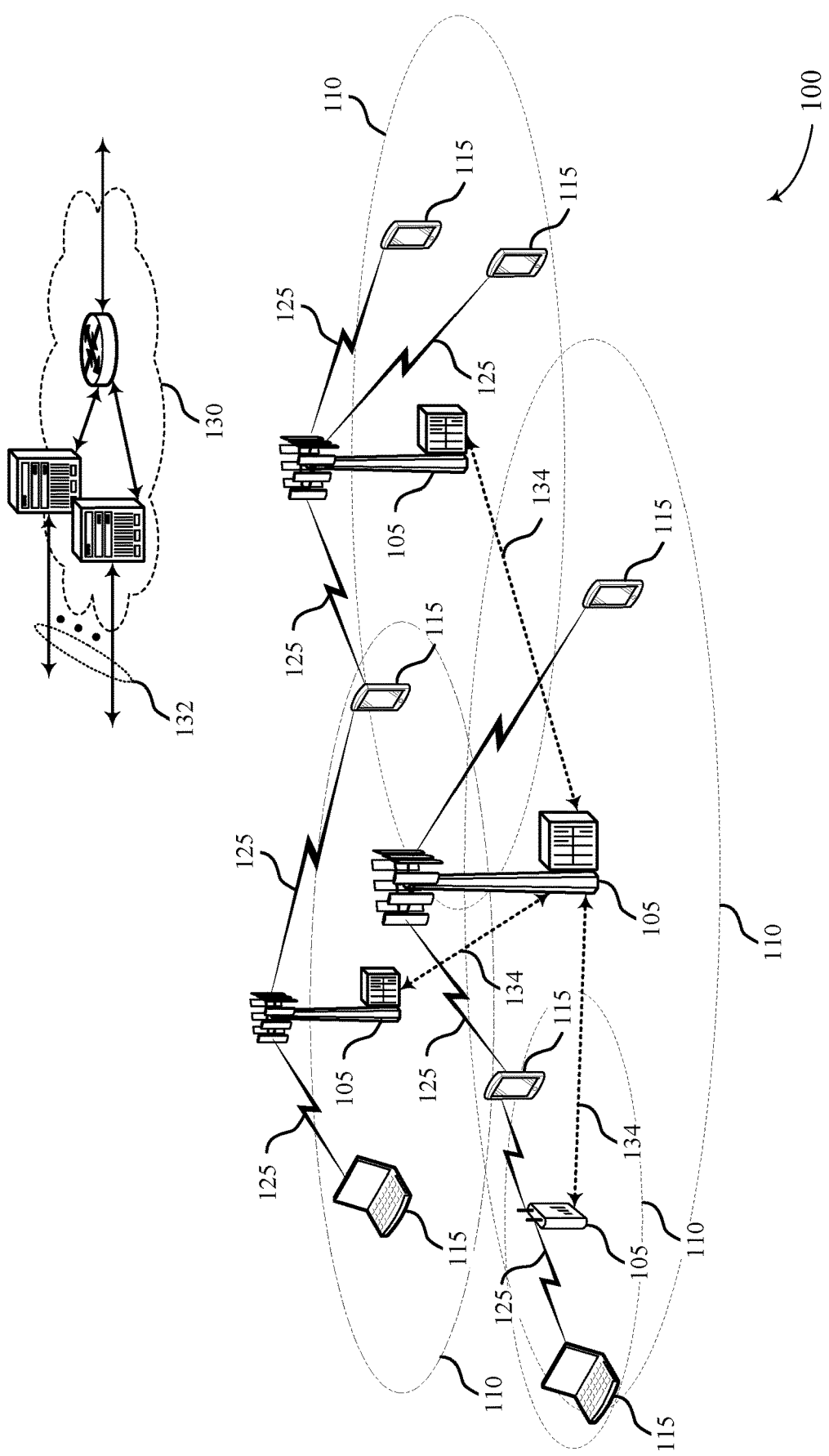
FIG. 1 illustrates an example of a wireless communications system that supports signal generation for OFDM-based systems in accordance with aspects of the present disclosure.

A user equipment (UE) and a base station may establish a connection for orthogonal frequency division multiplexing (OFDM) communications. The base station may transmit a series of sequences to the UE, for example, for the UE to synchronize with the base station. The base station and the UE may synchronize frame timing, cell identity, and frequency resource locations (among other aspects) based on the series of sequences. The base station may generate a signal that may include multiple time-domain sequences spanning multiple symbol periods. In some cases, the signal may include a band-limited sequence that may be repeated using a cover code with the signal occupying a set bandwidth of the carrier. A wireless communications network supporting the UE and the base station may set restrictions for a bandwidth of a band-limited signal, such that the transmitting wireless device may not transmit the signal outside of the bandwidth, or may set power limits for the band-limited signal outside of the bandwidth. Thus, the transmitting wireless device may transmit the band-limited signal only within the set bandwidth of the system bandwidth.

Some wireless communications systems may benefit from utilizing long sequences, which may have a length of multiple symbol periods, and which may sometimes include a non-integer number of symbol periods. In some cases, the base station may be unable to specify the signal in the frequency domain (e.g., if a sequence in the signal occupies a non-integer number of symbol periods). For example, two sequences may occupy a subframe, along with a few control symbols. If the two sequences occupy a total of 11 symbol periods (e.g., each sequence occupying 5.5 symbol periods), the base station may be unable to specify the symbol period which includes half of each sequence in the frequency domain.

To specify the OFDM symbols in the frequency domain, the base station may generate a second signal (e.g., a signal that approximates the first signal), which may be approximately equivalent to the first, original signal. The base station may generate the second signal by dividing the first signal into segments of samples. A length of a segment (e.g., the number of samples for that segment) may be based on a size of a symbol period, including a cyclic prefix length that may be specific to and/or unique to that symbol period. Generally, the base station may divide N sequences into M segments and transmit the M segments in the approximated signal over M symbol periods. Though this example describes a base station generating the approximated signal, a UE may also generate an approximated signal using the techniques described herein.

Dividing the signal into segments may introduce some non-ideal effects to the signal in the frequency domain, such as harmonics or interfering signals outside of the bandwidth of the band-limited, time-domain signal. The base station may therefore reduce signal power of the second signal (e.g., the signal approximating the first signal) outside of the set bandwidth of the original, band-limited signal. In a first example, the base station may apply a first transform operation, such as a fast Fourier transform (FFT), to each segment. The base station may adjust or modify (e.g., zero out) frequency components that are outside of the set bandwidth to obtain bandwidth-restricted segments. In another example, the base station may perform a minimum mean square error (MMSE) estimate of a segment, which may identify the non-zero frequency components within the set bandwidth. The base station may modify the MMSE estimate coefficients with placeholder values (e.g., zeros) to obtain bandwidth-restricted segments.

The base station may apply a second transform operation, such as an inverse FFT (IFFT), to the bandwidth-restricted segments to return the segments to the time domain. The base station may append some information (e.g., the last samples of the IFFT output) to the bandwidth-restricted segments (e.g., as a cyclic prefix at the beginning). The base station may generate the second signal that approximates the first signal by ordering the appended and bandwidth-restricted segments (e.g., sequentially) for each symbol period. The base station may then transmit the second signal that approximates the first signal to a UE. In some cases, the UE may be configured with the original, repeated sequence, and the UE may perform cross-correlation with the original sequence and the sequences in the second, approximated signal.

Aspects of the disclosure are initially described in the context of wireless communications systems. Aspects of the disclosure are further illustrated by and described with reference to a signal segmentation, bandwidth restrictions, an approximate signal generation, apparatus diagrams, system diagrams, and flowcharts that relate to signal generation for OFDM-based systems.

FIG. 1 illustrates an example of a wireless communications system 100 that supports signal generation for OFDM-based systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A transmitting wireless device, such as a base station 105 or a UE 115, may generate a band-limited signal including multiple long sequences over multiple symbol periods. The transmitting wireless device may divide the signal into signal segments, where the length of each signal segment may correspond to a symbol period used to transmit the signal segment. The transmitting wireless device may apply a bandwidth restriction to each signal segment to reduce any frequency components of the signal segments which may be outside of the band-limiting bandwidth. The transmitting wireless device may order the bandwidth-restricted segments based on an original order of the original signal to generate an approximate signal representing the original signal. The transmitting wireless device may transmit the approximate signal to a receiving device.

Figure 2:
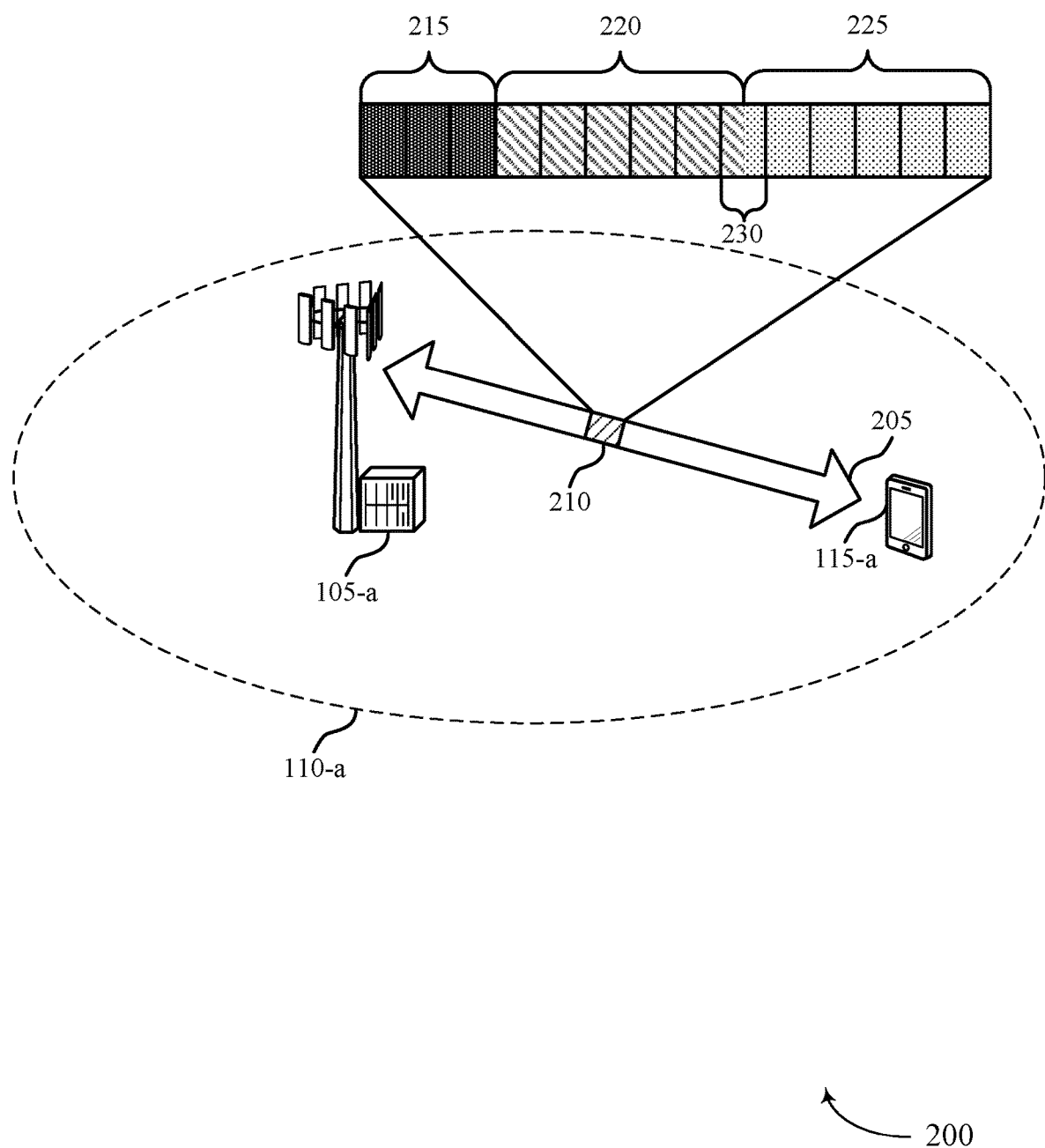
FIG. 2 illustrates an example of a wireless communications system that supports signal generation for OFDM-based systems in accordance with aspects of the present disclosure.

FIG. 2 illustrates an example of a wireless communications system 200 that supports signal generation for OFDM-based systems in accordance with aspects of the present disclosure. In some examples, the wireless communications system 200 may implement aspects of wireless communications system 100. The wireless communications system 200 includes base station 105-a and UE 115-a, which may be respective examples of a base station 105 and a UE 115 as described herein. Examples described in FIG. 2 are given by a base station 105 generating and transmitting an approximated signal to a UE 115. However, a UE 115 may also generate and transmit an approximated signal to a base station 105.

UE 115-a and base station 105-a may communicate over a carrier 205. The carrier 205 may be configured for OFDM communications. In some cases, base station 105-a may transmit a series of sequences to UE 115-a, for example, to synchronize with UE 115-a. Base station 105-a and UE 115-a may synchronize various aspects, such as frame timing, cell identity, and/or frequency resource locations based on the series of sequences. A sequence in the series may be, for example, a pseudorandom noise (PN) sequence or a Zadoff-Chu sequence. Base station 105-a may transmit sequences for non-synchronization related purposes as well. In some examples, UE 115-a may transmit sequences to base station 105-a as described herein.

Base station 105-a may generate a signal that may include multiple time-domain sequences spanning at least one, and in some cases, multiple symbol periods. The signal may be referred to as X[t]. The signal may be a bandlimited signal occupying a bandwidth, W, within a system bandwidth of the wireless communications system 200.

In an example, the signal may include N time-domain sequences, that may be placed in a pattern (e.g., consecutively) within a duration spanned by M OFDM symbols, where M may be greater than N and M and N may be co-prime. For example, the signal may include two long sequences which span a subframe including 14 OFDM symbols. Three of the symbols may be used for control information in some circumstances, such that the two sequences may span 11 symbols. As shown, a control information period 215 occupies 3 symbols, a first sequence 220 occupies 5.5 symbols, and a second sequence 225 occupies 5.5 symbols. In some cases, the first sequence 220 and the second sequence 225 may be of the same or different lengths and need not be the same sequence or length.

Base station 105-a may generate a signal including N pseudorandom sequences in time, occupying $W_{PRB}$ physical resource blocks (PRBs) in the center of the system bandwidth. Base station 105-a may compute a number of samples (e.g., non-zero samples) in an $S_{seq}$-point IFFT (as one example) to generate each sequence. For example, the number may be, $$S_{seq}^{PN} = \left\lceil 12 W_{PRB} * \frac{S_{seq}}{S_{symb}} \right\rceil,$$

where $S_{symb}$ may correspond to an information period or a useful symbol length of a symbol period. Then, for each of the N sequences, base station 105-a may generate an independent PN sequence of length $S_{seq}^{PN}$. Base station 105-a may place this sequence in a first location (e.g., along the center frequency) and may modify (e.g., pad) the sequence with information (e.g., with zeroes at the top and/or bottom) to generate a frequency domain sequence of sample size $S_{seq}$. Base station 105-a may then compute an $S_{seq}$-point IFFT of the sequence. To construct X[t], base station 105-a may place $\Delta_{seq}$ zeros, followed by the outputs of the N IFFTs, with the outputs being placed in a pattern or otherwise assembled according to a structure that may be pre-defined (e.g., sequentially), dynamic, or semi-static.

In some cases, the signal may include a band-limited sequence (e.g., a mother sequence $X_{mother}$) that may be repeated using a cover code. For example, the first sequence 220 and the second sequence 225 may each be based on the mother sequence. As an example, the first sequence 220 may be $X_{mother}$, and the second sequence 225 may be $-X_{mother}$, such that $X[t]=\{X_{mother}, -X_{mother}\}$. In some other examples, the sequences may be unrelated to each other, or at least may be different from each other.

Base station 105-a, however, may be unable to specify the signal in the frequency domain (e.g., if a sequence in the signal occupies a non-integer number of symbol periods). For example, a symbol period 230 may include a portion of the first sequence 220 and a portion of the second sequence 225.

Base station 105-a may generate an approximated signal 210 in the time domain, which may be approximately equivalent to the signal X[t] described above. The approximated signal 210 may be a time-domain signal and may be represented by $\hat{X}[t]$, retaining some of the characteristics of the original signal (e.g., X[t]). The approximated signal 210 may be specified in terms of the M OFDM symbols in the frequency domain. In this example, the approximated signal 210 may enable a frequency domain specification of the 11 OFDM symbols occupied by the first sequence 220 and the second sequence 225.

Base station 105-a may generate the approximated signal 210 by segmenting the signal, X[t], into segments (e.g., chunks), which may in some cases be segments of samples. The segments may correspond to a size of a symbol period in some cases. Base station 105-a may take a number of segments, $C_{X[t]}^{i}$, of length $S_{symb}+S_{CP}^{i}$ samples, where $S_{CP}^{i}$ may correspond to a cyclic prefix period of the symbol period. Generally, $C_{X[t]}^{i}$ may correspond to any segment of the M segments, where i ranges from 1 to M. Sequentially, the $S_{symb}$ samples may follow the $S_{CP}^{i}$ samples within the approximated signal 210.

The number of samples $S_{symb}$ may be common across different segments and may be based on subcarrier spacing, $\Delta f_{SC}$, and/or a base sampling frequency, $f_s$, of the wireless communications system 200. In one non-limiting example, $$S_{symb} = \frac{f_s}{\Delta f_{SC}}.$$

The number of samples in a cyclic prefix may be based on a cyclic prefix configuration for a specific symbol period, which may include long cyclic prefixes or short cyclic prefixes. A long cyclic prefix may relate to a cyclic prefix longer than a set threshold or length, and a short cyclic prefix may relate to a cyclic prefix shorter than the set threshold or length. In some other examples, a long cyclic prefix and a short cyclic prefix may relate to cyclic prefixes including a certain number of samples, such as ¼th of the symbol length or ⅛th of the symbol length, respectively. Generally, base station 105-a may segment the N sequences into M segments, may adjust frequency components for the M segments, and may transmits the M segments in the approximated signal 210 during M symbol periods. The segmenting process is described in more detail with respect to FIG. 3.

In some cases, dividing the signal into segments may introduce some adverse effects to the signal in the frequency domain, such as harmonics or interfering signals outside of the bandwidth of the band-limited, time-domain signal. Thus, base station 105-a may implement further techniques to reduce or eliminate frequency components of the approximated signal 210 outside of the bandwidth W.

In a first example, base station 105-a may apply an $S_{symb}$-point FFT to each segment. Base station 105-a may apply the FFT to the last $S_{symb}$ samples of the segment to obtain samples, $F^i$, in the frequency domain. Base station 105-a may zero out frequency components of $F^i$ which are outside of the bandwidth, W, to obtain a bandwidth-restricted segment. Base station 105-a may apply an $S_{symb}$-point IFFT to return the bandwidth-restricted segment to the time domain. The output of the IFFT may correspond to the segment $C_{X[t]}^i$ with frequency values within the bandwidth W. Base station 105-a may append the last $S_{CP}^i$ samples of the IFFT output to the beginning of the output. The appended output may be referred to as $C_{\tilde{X}[t]}^i$. The first example is described in more detail with reference to FIG. 4.

In another example, base station 105-a may perform a statistical estimate to derive the non-zero frequency components of a segment corresponding to the bandwidth W. In some cases, base station 105-a may perform an MMSE estimate of a segment $C_{X[t]}^i$. Base station 105-a may identify the non-zero frequency components of a segment within the bandwidth and modify (e.g., pad) the MMSE estimate coefficients with information (e.g., zeros, placeholder information) to generate the bandwidth-restricted segment. Base station 105-a may apply an $S_{symb}$-point IFFT to the bandwidth-restricted segment to return the segment to the time domain. The output may correspond to the segment $C_{X[t]}^i$ with frequency values within the bandwidth W. In one example, base station 105-a may append the last $S_{CP}^i$ samples of the IFFT output to the beginning of the output. The appended IFFT output may be referred to as $C_{\tilde{X}[t]}^i$. This example is described in more detail with reference to FIG. 5.

Base station 105-a may then generate the approximated signal 210 by performing one or more operations (e.g., by placing the appended and bandwidth-restricted segments, $C_{\tilde{X}[t]}^i$ in an order or organization for each symbol period). For example, if the sequences of the approximated signal 210 are transmitted in 11 symbol periods as shown, symbol periods 1-5 may carry $C_{\tilde{X}[t]}^1$ through $C_{\tilde{X}[t]}^5$, each of which corresponds to the first sequence 220. The symbol period 230 (e.g., the sixth symbol period) may carry $C_{\tilde{X}[t]}^6$, which includes a portion of the first sequence 220 and a portion of the second sequence 225. The remaining symbol periods include $C_{\tilde{X}[t]}^7$ to $C_{\tilde{X}[t]}^{11}$, may carry portions of the second sequence 225. Combining the segments is described in more detail with reference to FIG. 6.

In some cases, UE 115-a may be configured with the original mother sequence, $X_{mother}$. UE 115-a may receive the approximated signal 210 and may perform a cross-correlation between the mother sequence and the sequences in the approximated signal 210.

Figure 3:
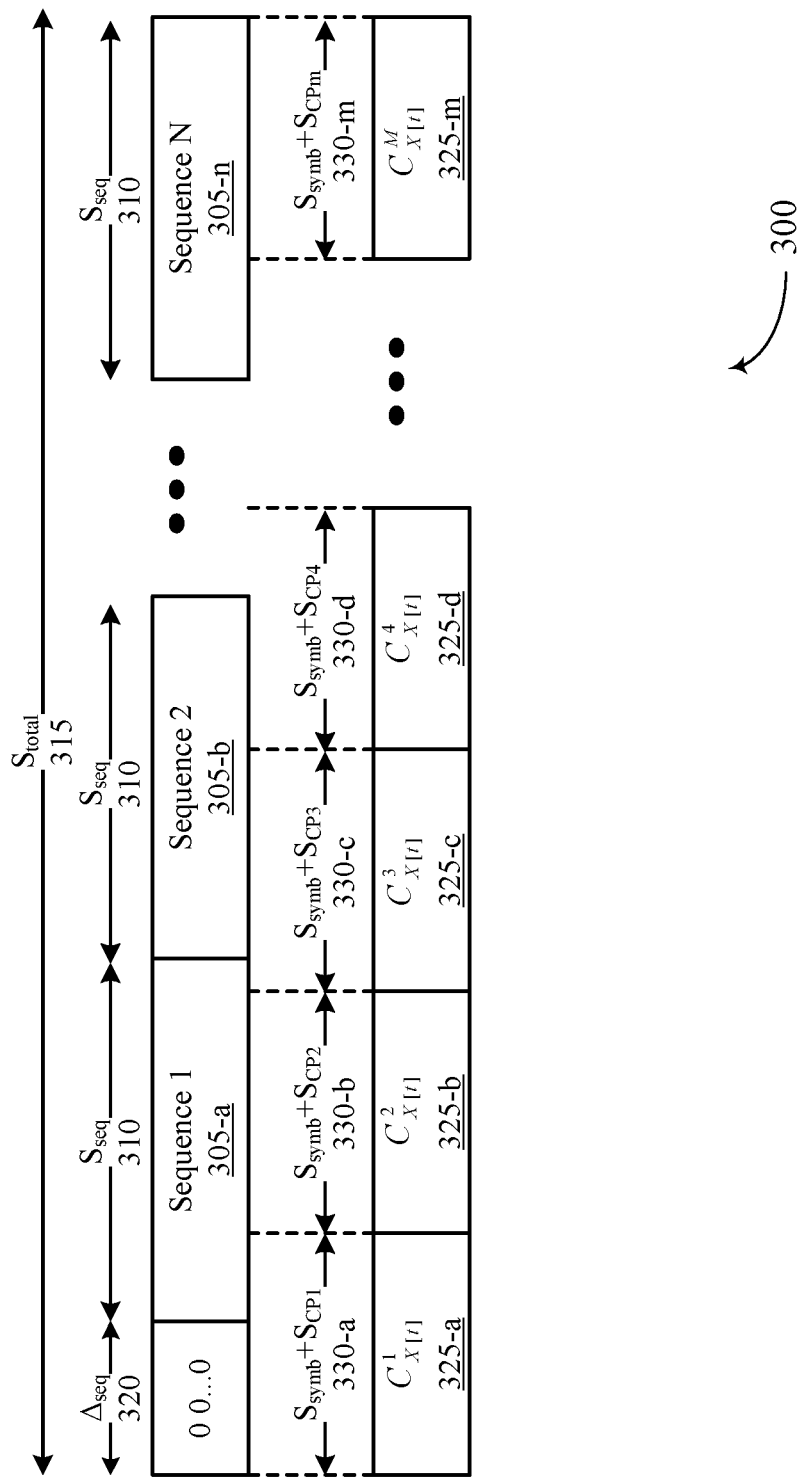
FIG. 3 illustrates an example of a signal segmentation that supports signal generation for OFDM-based systems in accordance with aspects of the present disclosure.

FIG. 3 illustrates an example of a signal segmentation 300 that supports signal generation for OFDM-based systems in accordance with aspects of the present disclosure. In some examples, the signal segmentation 300 may implement aspects of wireless communications system 100. The signal segmentation 300 may relate to segmenting a time-domain signal into an approximated signal as described with reference to FIG. 2.

A transmitting wireless device, such as a UE 115 or a base station 105, may generate a time-domain signal including multiple sequences 305. The sequences may be used for synchronization at a receiving wireless device. In some cases, the sequences 305 may be based on a mother sequence, $X_{mother}$, repeated multiple times using a cover code. For example, sequence 305-a may be the mother sequence, $X_{mother}$, and sequence 305-b may be a variation, such as $-X_{mother}$, or the conjugate, or another sequence based on the mother sequence. The mother sequence may, in some examples, be or include a PN sequence or a Zadoff-Chu sequence.

Each sequence may span a sequence length 310, referred to as $S_{seq}$. The total time of the sequence lengths 310 may span a signal length 315 ($S_{total}$). In some cases, the transmitting wireless device may add a delta period 320 ($\Delta_{seq}$), which may add samples to the signal to make the signal length 315 equal to an integer number of symbol periods. In some cases, the sequences 305 may have a similar sequence length 310. In some other examples, different sequences may have different lengths.

In order to segment the time-domain signal into an approximated signal, the transmitting wireless device may take sequential segments of the time-domain signal. Generally, the transmitting wireless device may segment N sequences into M segments, corresponding to M symbol periods. In some examples, a segment 325 may have a base size of $S_{symb}$ samples as well as a number of samples corresponding to a cyclic prefix for a symbol period. In some cases, $S_{symb}$ may be based on a subcarrier spacing as well as a base sampling frequency of the system (e.g., based on the system bandwidth). Thus, a segment length 330 may be based on or equal to a length of a symbol period, where the length of the symbol period may include a length of an information period (corresponding to $S_{symb}$) and a length of a cyclic prefix for the symbol period ($S_{CP}^i$). In some examples, a segment length (e.g., segment length 330-m) may be shorter than a sequence length (e.g., such as sequence length 310).

As described with reference to FIGS. 4 and 5, the length or size of $S_{symb}$ may correspond to a number of samples for a transform, such as an FFT or an IFFT. Different segments 325 may use different cyclic prefix lengths, and thus the number of samples for a cyclic prefix may vary from segment to segment in some examples. Generally, the samples for the cyclic prefix may be located at the beginning of the segment 325 (i.e., corresponding to a prefix for the samples of $S_{symb}$).

For example, segment 325-a, $C_{X[t]}^1$, may correspond to the samples included in the delta period 320 and a first portion of sequence 305-a. Segment 325-a may have segment length 330-a. Segment length 330-a may, in some cases, correspond to a number of $S_{symb}$ samples plus $S_{CP}^1$ samples. The cyclic prefix for the first symbol period, for example, may be a long cyclic prefix or a short cyclic prefix (e.g., being of predefined lengths, in some cases).

Segment 325-*b*, $C_{X[t]}{}^2$, may correspond to samples included in sequence 305-*a*. Segment 325-*b* may have segment length 330-*b*, based on $S_{symb}$ and $S_{CP}{}^2$, where $S_{CP}{}^2$ may be based on a length of the cyclic prefix for the second symbol period.

Segment 325-*c* may include a portion of sequence 305-*a* and a portion of sequence 305-*b* and may have a segment length 330-*c*. Segment 325-*d* may include a portion of sequence 305-*b* and a subsequent sequence (not shown). Segment 325-*d* may have segment length 330-*d*.

The transmitting wireless device may divide each of the sequences 305 into segments 325, through the last sequence in the signal, sequence 305-*n*. Segment 325-*m* may include the last portion of sequence 305-*n*, and its segment length 330-*m* may be based on a symbol period length for the m-th symbol period. In some examples, a segment length (e.g., segment length 330-*m*) may be shorter than a sequence length (e.g., such as sequence length 310).

After segmenting each of the sequences 305, the transmitting wireless device may adjust out-of-bandwidth frequency components as described with reference to FIGS. 4 and 5. In some cases, segmenting the sequences may introduce harmonics at frequencies outside of the band-limiting bandwidth W. The transmitting wireless device may therefore implement techniques to reduce or zero out these out-of-bandwidth frequencies.

Figure 4:
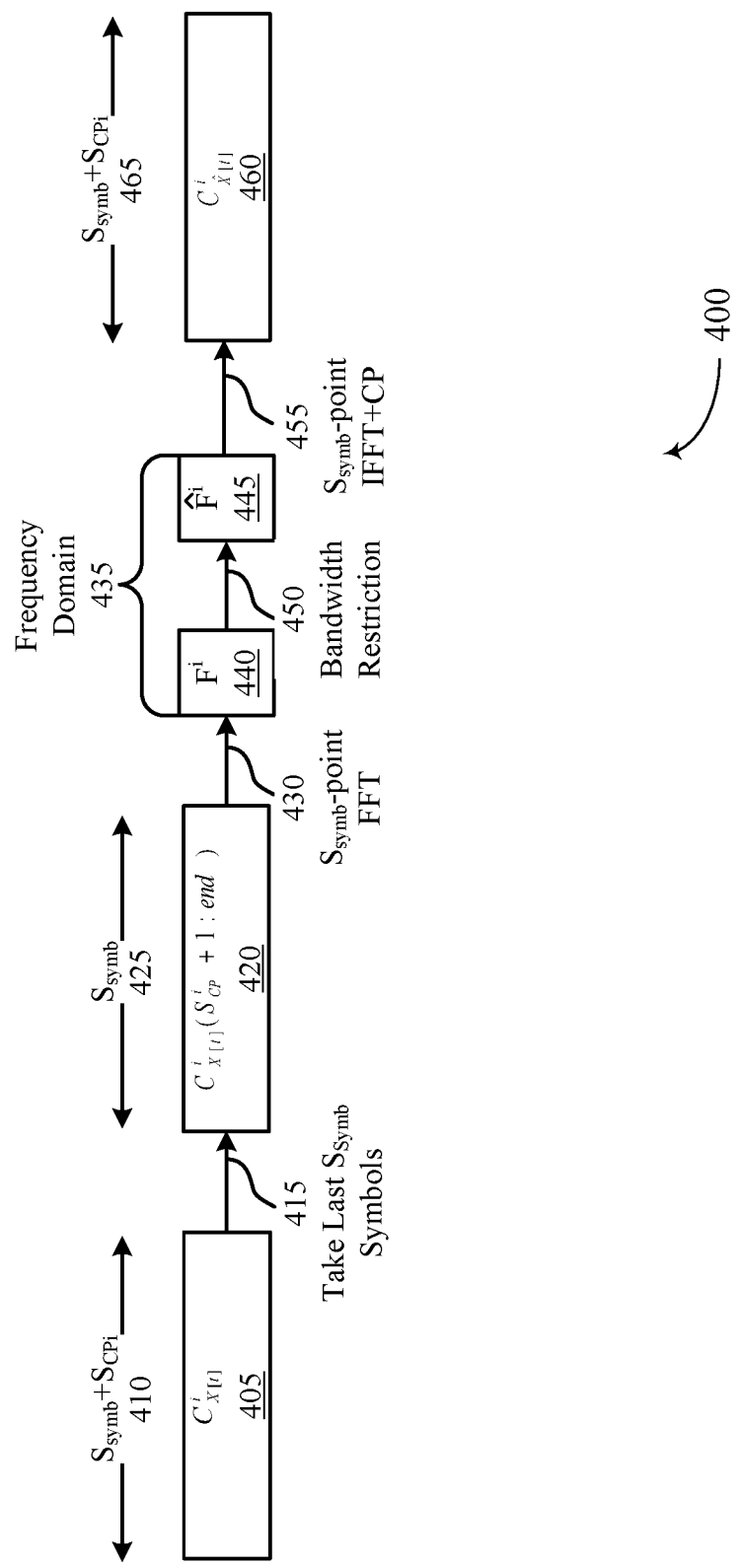
FIGS. 4 and 5 illustrate examples of bandwidth restrictions that supports signal generation for OFDM-based systems in accordance with aspects of the present disclosure.

FIG. 4 illustrates an example of a bandwidth restriction 400 that supports signal generation for OFDM-based systems in accordance with aspects of the present disclosure. In some examples, the bandwidth restriction 400 may implement aspects of wireless communications system 100.

A transmitting wireless device, such as a UE 115 or a base station 105, may split a time-domain, band-limited signal into multiple segments as described with reference to FIG. 3. The segmentation may, however, introduce harmonics or frequency components outside of the bandwidth to which the signal is band-limited. Using the bandwidth restriction 400, the transmitting wireless device may restrict frequency components of a segment 405, $C_{X[t]}{}^i$, to the limiting bandwidth W. The segment 405 may have a segment length 410 of $S_{symb}+S_{CP}{}^i$ samples.

At 415, the transmitting wireless device may take the last $S_{symb}$ samples of the segment 405, creating a segment portion 420. The segment portion 420 may include samples of the segment 405, without the samples corresponding to the cyclic prefix. Thus, the segment portion 420 may include the samples $C_{X[t]}{}^i$ ($S_{CP}{}^i+1$: end). The segment portion 420 may have a segment portion length 425 of $S_{symb}$ samples.

At 430, the transmitting wireless device may take an $S_{symb}$-point FFT of the last $S_{symb}$ samples of the segment 405 (e.g., the segment portion 420). The output of the FFT may be referred to as a transformed segment 440, or $F^i$. The transformed segment 440 may represent the values of the segment portion 420 in the frequency domain 435.

The transmitting wireless device may apply a bandwidth restriction operation 450 to the transformed segment 440. For example, the transmitting wireless device may modify (e.g., zero-out) any frequency components of $F^i$ outside of the bandwidth W to generate a bandwidth-restricted, transformed segment 445, which may be referred to as $\hat{F}^i$.

At 455, the transmitting wireless device may take an $S_{symb}$-point IFFT of $\hat{F}^i$ and append the last $S_{CP}{}^i$ samples from the IFFT output to the beginning to generate a transform output 460, which may be referred to as $C_{\hat{X}[T]}{}^i$. The transform output 460 may have a transform output length 465 of $S_{symb}+S_{CP}{}^i$ samples. The transform output 460 may be based on the segment 405, and may have the same length, but the transform output 460 may have its bandwidth restricted to the bandwidth W of the band-limited signal, and the transform output 460 may have a cyclic prefix.

The transmitting wireless device may generate the transform output 460 corresponding to each segment, as described with reference in FIG. 3. For example, if there is a first time-domain signal with N sequences split into M segments, the transmitting wireless device may generate M transform outputs 460. The transmitting wireless device may group the M transform outputs 460 together to generate a second signal that approximates the first time-domain signal (e.g., the N sequences of the first time-domain signal). The transmitting wireless device may group the transform outputs 460 as described with reference to FIG. 6.

Figure 5:
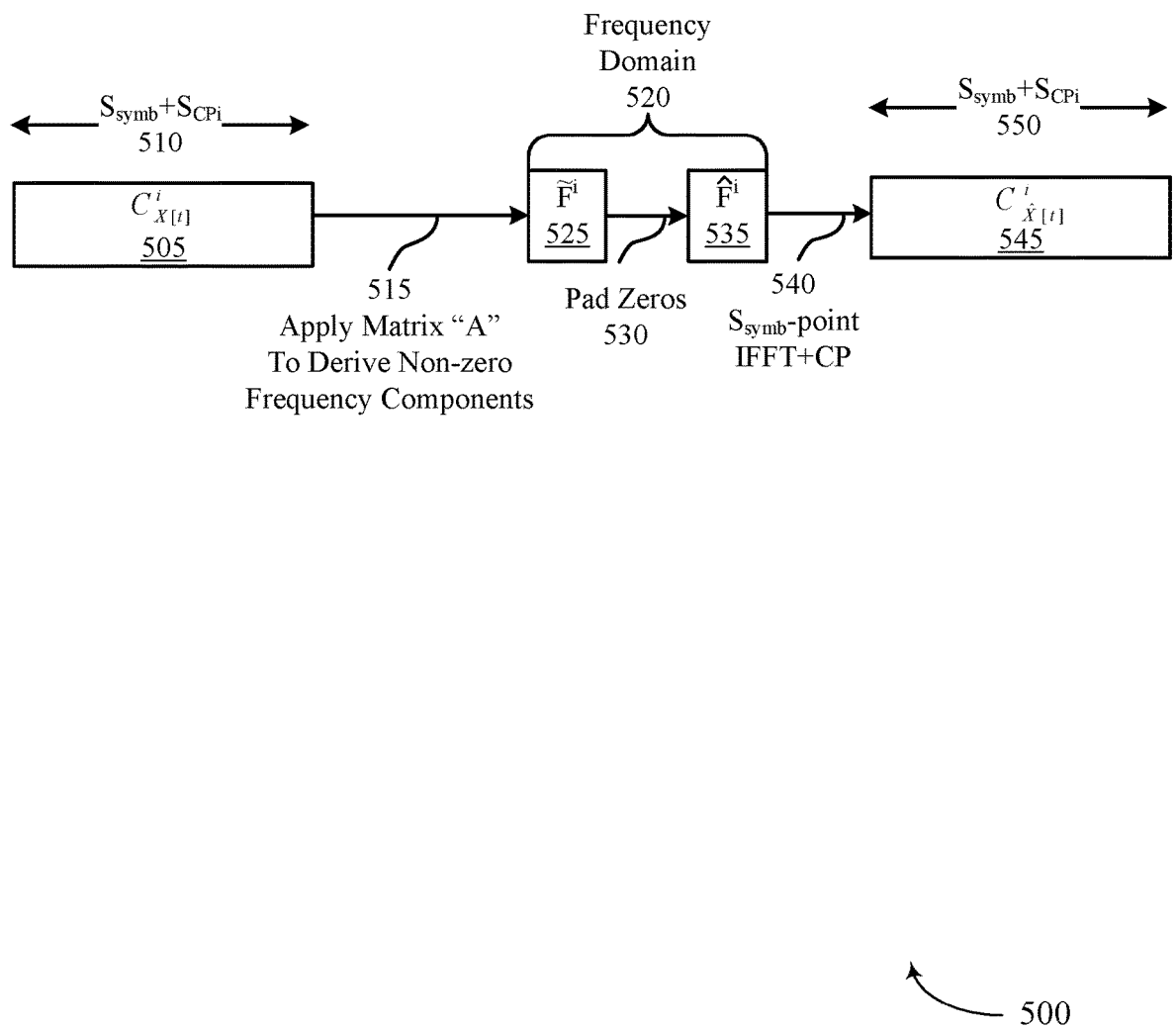

FIG. 5 illustrates an example of a bandwidth restriction 500 that supports signal generation for OFDM-based systems in accordance with aspects of the present disclosure. In some examples, the bandwidth restriction 500 may implement aspects of wireless communications system 100.

A transmitting wireless device, such as a UE 115 or a base station 105, may segment a time-domain, band-limited signal into multiple segments as described with reference to FIG. 3. The segmentation may, however, introduce harmonics or frequency components outside of the bandwidth to which the signal is band-limited. Using the bandwidth restriction 500, the transmitting wireless device may restrict frequency components of a segment 505, $C_{X[t]}{}^i$, to the limiting bandwidth W. The segment may have a segment length 510 of $S_{symb}+S_{CP}{}^i$ samples.

At 515, the transmitting wireless device may derive the non-zero frequency components corresponding to the bandwidth W by applying a transform. The transmitting wireless device may take an MMSE estimate and obtain MMSE estimate coefficients 525 by applying Equation (1) below, as one example method, where $\tilde{F}^i$ denotes the MMSE estimate coefficients 525 of $C_{X[t]}{}^i$ in the bandwidth W.

$$\tilde{F}^i (A^H A)^{-1} A^H C_{X[t]}{}^i \tag{1}$$

The MMSE estimate coefficients 525 may be formed based on the elements in the bandwidth W. The MMSE matrix, A, may be generated based on the bandwidth, W, and the number of samples in $S_{symb}$ and $S_{CP}{}^i$. For example, $$A \text{ may} = \begin{pmatrix} C\tilde{Q}^{-1} \\ \tilde{Q}^{-1} \end{pmatrix},$$

where $Q^{-1}$ is the normalized inverse discrete Fourier transform (DFT) kernel (e.g., matrix) of order $S_{symb}$, and $\tilde{Q}^{-1}$ is obtained from $Q^{-1}$ by retaining the columns of $Q^{-1}$ corresponding to the bandwidth W of the original, band-limited signal X[t]. C may be an augmented matrix based on an $S_{CP}{}^i$-order identity matrix, $I_{S_{CP}{}^i}$, where $C=[0_{S_{CP}{}^i \times (S_{symb}-S_{CP}{}^i)} | I_{S_{CP}{}^i}]$.

At 530, the transmitting wireless device may pad, or fill out, the MMSE estimate coefficients 525 with zeros to generate a bandwidth-restricted, transformed segment 535, which may be referred to as $\hat{F}^i$. The bandwidth-restricted, transformed segment 535 may include $S_{symb}$ samples. Both the MMSE estimate coefficients 525 and the bandwidth-restricted, transformed segment 535 may be associated with the frequency domain 520.

At 540, the transmitting wireless device may take an $S_{symb}$-point IFFT of $\hat{F}^i$ and append the last $S_{CP}{}^i$ samples from the IFFT output to the beginning to generate a transform output 545, which may be referred to as $C_{\hat{X}[T]}{}^i$. The transform output 545 may have a transform output length 550 of $S_{symb}+S_{CP}{}^i$ samples. The transform output 545 may be based on the segment 505, and may have the same length, but the transform output 545 may have its bandwidth restricted to the bandwidth W of the band-limited signal, and the transform output 545 may have a cyclic prefix.

The transmitting wireless device may generate the transform output 545 corresponding to each segment, as described with reference to FIG. 3. For example, if there is a first time-domain signal with N sequences split into M segments, the transmitting wireless device may generate M transform outputs 545. The transmitting wireless device may group the M transform outputs 545 together to generate a second signal which approximates the first time-domain signal (e.g., the N sequences of the first time-domain signal). The transmitting wireless device may group the transform outputs 545 as described with reference to FIG. 6.

Figure 6:
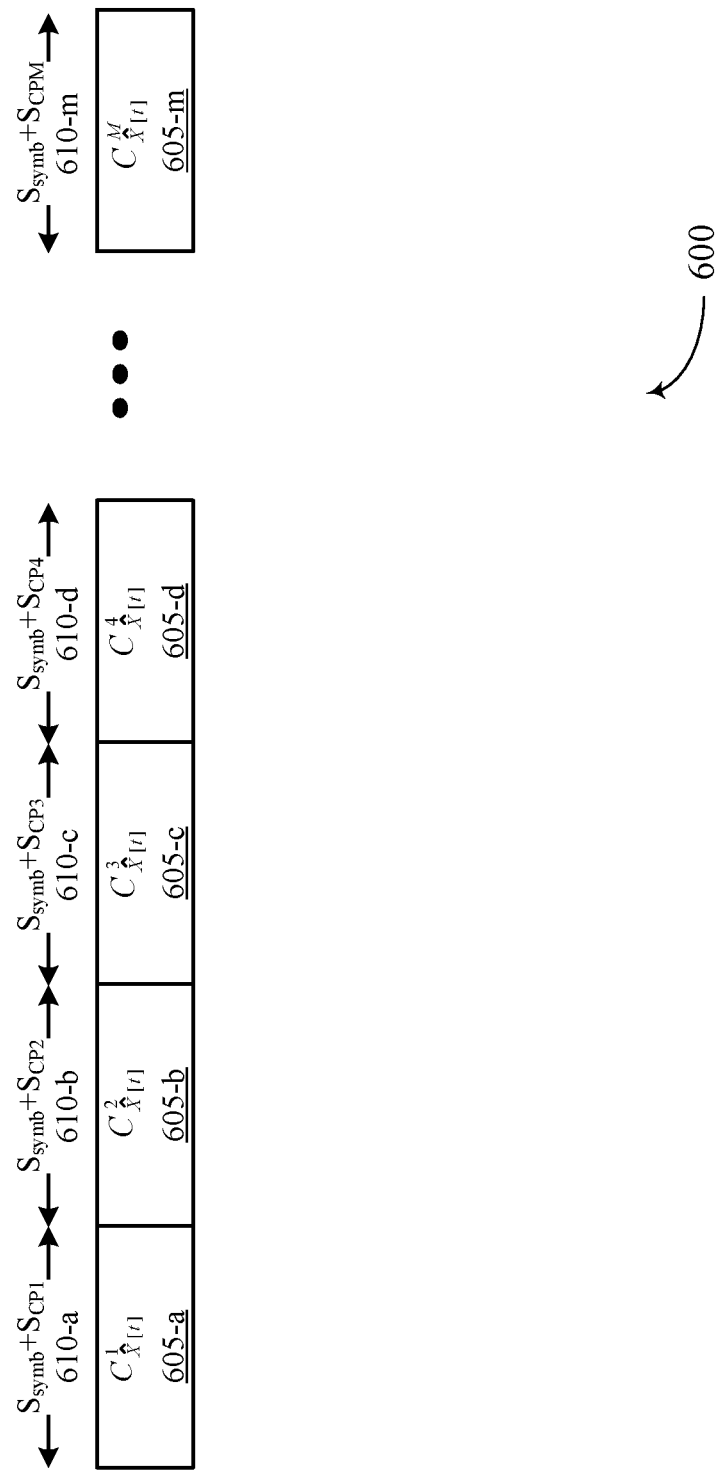
FIG. 6 illustrates an example of an approximate signal generation that supports signal generation for OFDM-based systems in accordance with aspects of the present disclosure.

FIG. 6 illustrates an example of an approximate signal generation 600 that supports signal generation for OFDM-based systems in accordance with aspects of the present disclosure. In some examples, the approximate signal generation 600 may implement aspects of wireless communications system 100.

A transmitting wireless device, such as a UE 115 or a base station 105, may identify a time-domain, bandwidth-limited signal X[t] as described with reference to FIG. 2. The signal may be limited to a bandwidth W and may include N sequences transmitted over M symbol periods, where M is greater than N, and M and N are co-prime. The transmitting wireless device may split the signal into multiple segments or chunks as described with reference to FIG. 3. The transmitting wireless device may then apply a bandwidth restriction to each segment as described with reference to FIG. 4 or 5 to generate a bandwidth-restricted segment 605.

After the bandwidth restriction, each bandwidth-restricted segment 605 may have frequency components only within the bandwidth W. The transmitting wireless device may also append a cyclic prefix to each bandwidth-restricted segment (e.g., referred to as transform outputs 460 and 545) as described with reference to FIG. 4 or 5. A bandwidth-restricted segment 605 may have a length 610 of $S_{symb}+S_{CP}{}^i$ samples, where $S_{CP}{}^i$ may be based on the length of the cyclic prefix appended to the bandwidth-restricted segment 605 and may additionally be based on the corresponding symbol period. Thus, in some examples, a bandwidth-restricted segment 605 may have a same length as its corresponding segment before the bandwidth restriction.

For example, bandwidth-restricted segment 605-*a* may have length 610-*a*, including $S_{symb}+S_{CP1}$ samples, bandwidth-restricted segment 605-*b* may have length 610-*b*, including $S_{symb}+S_{CP2}$ samples, bandwidth-restricted segment 605-*c* may have length 610-*c*, including $S_{symb}+S_{CP3}$ samples, and bandwidth-restricted segment 605-*d* may have length 610-*d*, including $S_{symb}+S_{CP4}$ samples. The last segment, bandwidth-restricted segment 605-*m* may have length 610-*m*, including $S_{symb}+S_{CPm}$ samples.

In the approximate signal generation 600, the transmitting wireless device may conjoin the bandwidth-restricted segments 605 based on various factors (e.g., an original ordering of the segments, a pattern related to the ordering of the segments). For example, if bandwidth-restricted segment 605-*a* is based on segment 325-*a* from FIG. 3, and bandwidth-restricted segment 605-*b* is based on segment 325-*b* from FIG. 3, the transmitting wireless device may place bandwidth-restricted segment 605-*b* after bandwidth-restricted segment 605-*a*, because segment 325-*b* is subsequent to segment 325-*a*.

The transmitting wireless device may place each bandwidth-restricted segment 605 accordingly. For example, the transmitting wireless device may place bandwidth-restricted segment 605-*c* after bandwidth-restricted segment 605-*b*, may place bandwidth-restricted segment 605-*d* as shown, and so on through bandwidth-restricted segment 605-*m*. With each bandwidth-restricted segment 605 placed in its corresponding location, the transmitting wireless device may generate a signal which approximates the original time-domain signal X[t]. The approximated signal may be referred to as X̂[t].

The receiving device may identify a set of sequences including at least a first sequence. The receiving device may receive, from the transmitting wireless device, a first signal in the time domain including a set of symbols spanning a bandwidth for a set of symbol periods. The signal received at the receiving device may correspond to the approximated signal X̂[t]. The receiving device may identify a first set of samples corresponding to a first sequence in a first symbol period of the set of symbol periods of the first signal. The receiving device may then identify a second set of samples corresponding to the first sequence in a second symbol period subsequent to the first symbol period of the set of symbol periods of the first signal. The receiving device may combine the first set of samples and the second set of samples to identify at least a portion of a second sequence which approximates the first sequence.

Figure 7:
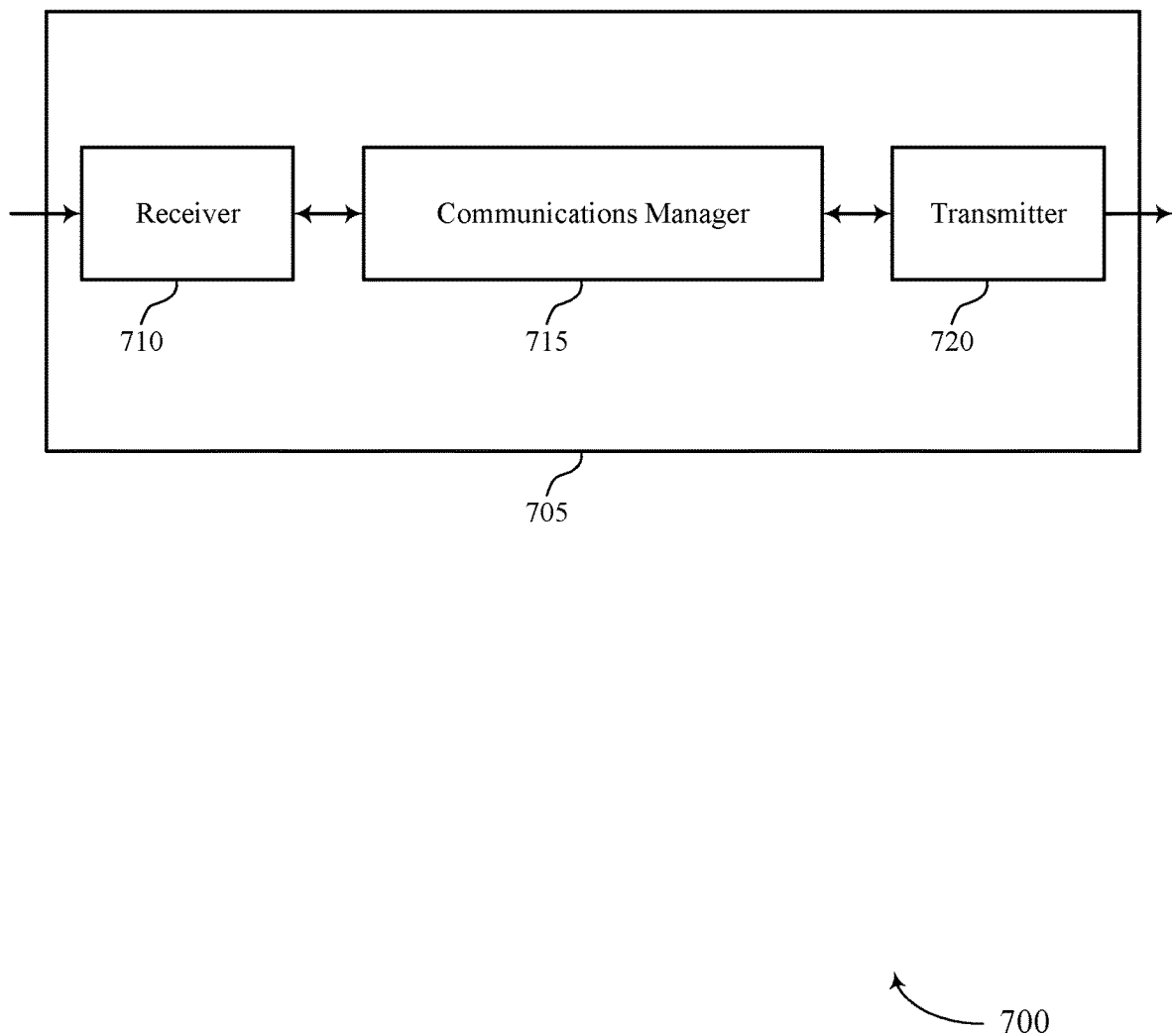
FIGS. 7 and 8 show block diagrams of devices that support signal generation for OFDM-based systems in accordance with aspects of the present disclosure.

FIG. 7 shows a block diagram 700 of a device 705 that supports signal generation for OFDM-based systems in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to signal generation for OFDM-based systems, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify, at a first wireless device, a first signal in a time domain, the first signal including a set of sequences spanning a bandwidth for a set of symbol periods, segment the first signal into a set of signal segments, where each signal segment corresponds to a respective symbol period of the set of symbol periods, apply a first transform operation to each signal segment of the set of signal segments to obtain a set of transformed signal segments, apply a second transform operation different from the first transform operation to each transformed signal segment to obtain a set of output signal segments, generate a second signal in the time domain based on obtaining the set of the output signal segments, and transmit the second signal to a second wireless device.

The communications manager 715 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to identify at least a portion of a second sequence which approximates the first sequence. The communications manager 715 may be an example of aspects of the communications manager 1010 or 1110 as described herein.

The communications manager 715 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to generate at least a portion of a second sequence which approximates the first sequence. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
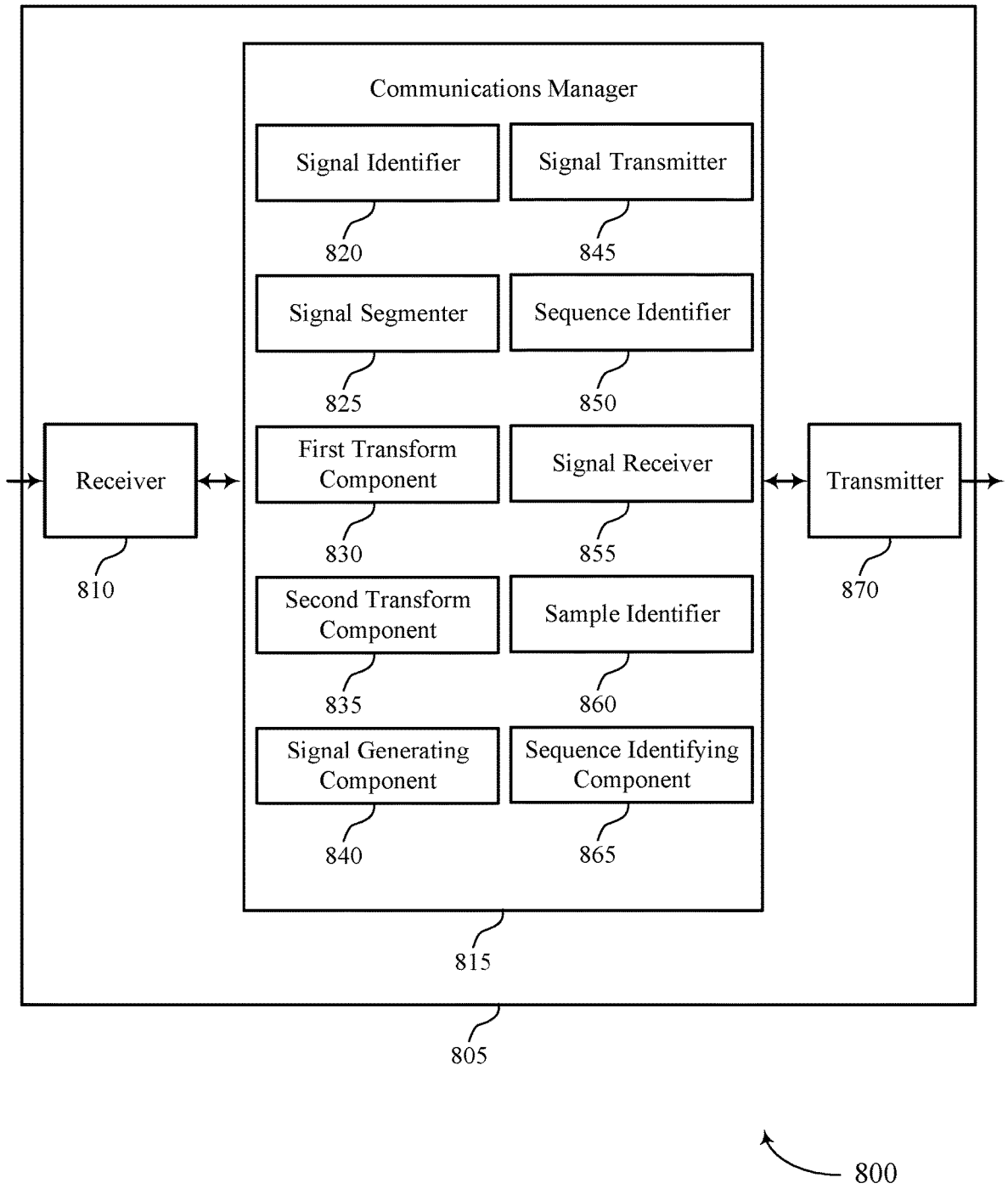

FIG. 8 shows a block diagram 800 of a device 805 that supports signal generation for OFDM-based systems in accordance with aspects of the present disclosure. The device 805 may be an example of aspects of a device 705, a UE 115, or a base station 105 as described herein. The device 805 may include a receiver 810, a communications manager 815, and a transmitter 870. The device 805 may also include a processor. Each of these components may be in communication with one another (e.g., via one or more buses).

Receiver 810 may receive information such as packets, user data, or control information associated with various information channels (e.g., control channels, data channels, and information related to signal generation for OFDM-based systems, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a signal identifier 820, a signal segmenter 825, a first transform component 830, a second transform component 835, a signal generating component 840, a signal transmitter 845, a sequence identifier 850, a signal receiver 855, a sample identifier 860, and a sequence identifying component 865. The communications manager 815 may be an example of aspects of the communications manager 1010 or 1110 as described herein.

The signal identifier 820 may identify, at a first wireless device, a first signal in a time domain, the first signal including a set of sequences spanning a bandwidth for a set of symbol periods. The signal segmenter 825 may segment the first signal into a set of signal segments, where each signal segment corresponds to a respective symbol period of the set of symbol periods. The first transform component 830 may apply a first transform operation to each signal segment of the set of signal segments to obtain a set of transformed signal segments. The second transform component 835 may apply a second transform operation different from the first transform operation to each transformed signal segment to obtain a set of output signal segments. The signal generating component 840 may generate a second signal in the time domain based on obtaining the set of the output signal segments. The signal transmitter 845 may transmit the second signal to a second wireless device.

The sequence identifier 850 may identify, at a first wireless device, a set of sequences including at least a first sequence. The signal receiver 855 may receive, from a second wireless device, a first signal in a time domain, the first signal including a set of symbols spanning a bandwidth for a set of symbol periods. The sample identifier 860 may identify a first set of samples corresponding to the first sequence in a first symbol period of the set of symbol periods of the first signal, and identify a second set of samples corresponding to the first sequence in a second symbol period subsequent to the first symbol period of the set of symbol periods of the first signal. The sequence identifying component 865 may combine the first set of samples and the second set of samples to identify at least a portion of a second sequence which approximates the first sequence. In some cases, the sequence identifying component 865 may combine the first set of samples and the second set of samples to generate at least a portion of a second sequence which approximates the first sequence.

Transmitter 870 may transmit signals generated by other components of the device 805. In some examples, the transmitter 870 may be collocated with a receiver 810 in a transceiver module. For example, the transmitter 870 may be an example of aspects of the transceiver 1020 or 1120 as described with reference to FIGS. 10 and 11. The transmitter 870 may utilize a single antenna or a set of antennas.

Figure 9:
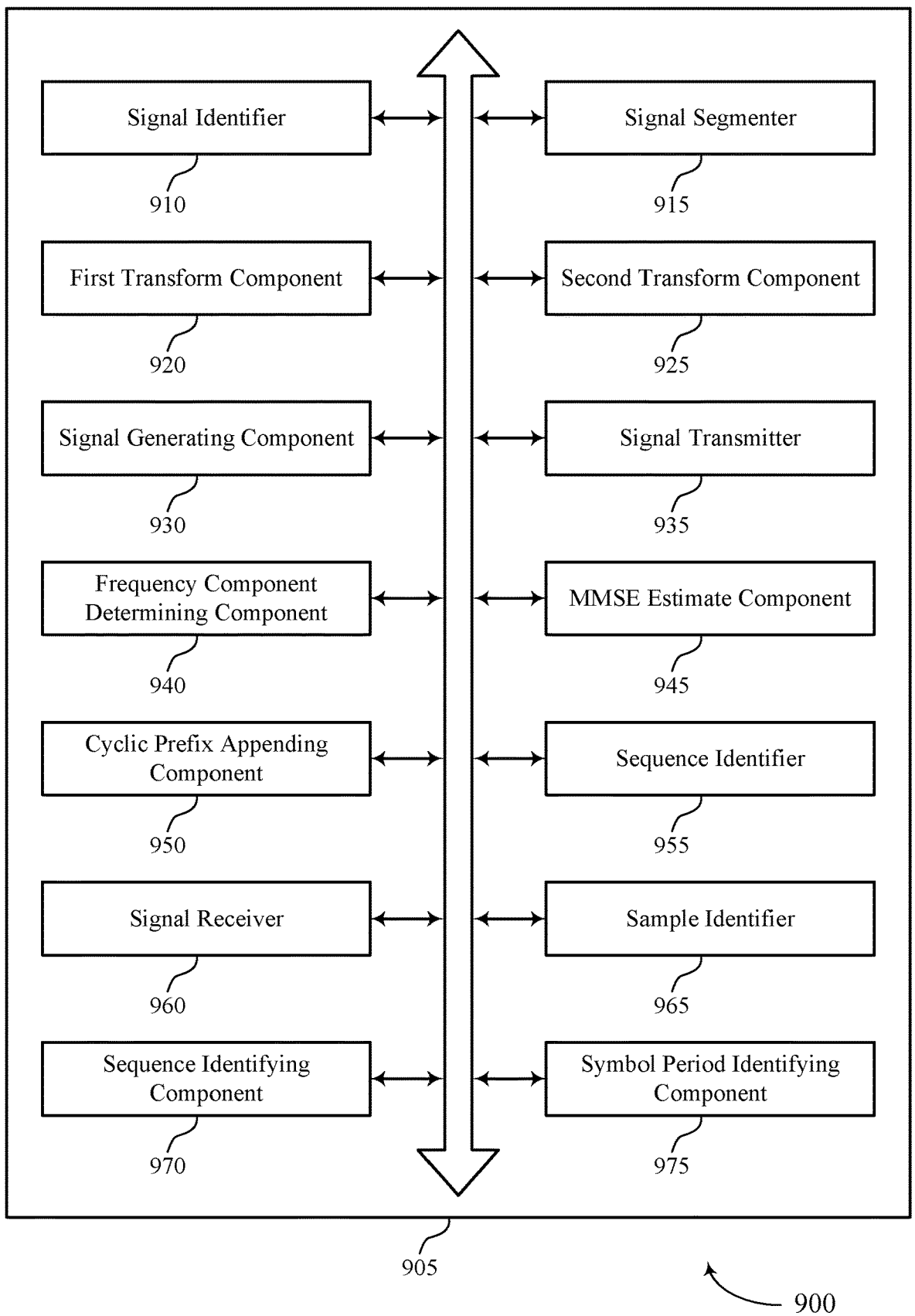
FIG. 9 shows a block diagram of a device that supports signal generation for OFDM-based systems in accordance with aspects of the present disclosure.

FIG. 9 shows a block diagram 900 of a communications manager 905 that supports signal generation for OFDM-based systems in accordance with aspects of the present disclosure. The communications manager 905 may be an example of aspects of a communications manager 715, a communications manager 815, or a communications manager 1010 described herein. The communications manager 905 may include a signal identifier 910, a signal segmenter 915, a first transform component 920, a second transform component 925, a signal generating component 930, a signal transmitter 935, a frequency component determining component 940, a MMSE estimate component 945, a cyclic prefix appending component 950, a sequence identifier 955, a signal receiver 960, a sample identifier 965, a sequence identifying component 970, and a symbol period identifying component 975. Each of these modules may communicate, directly or indirectly, with one another (e.g., via one or more buses).

The signal identifier 910 may identify, at a first wireless device, a first signal in a time domain, the first signal including a set of sequences spanning a bandwidth for a set of symbol periods. In some cases, a symbol period of the set of symbol periods includes an information period and a cyclic prefix period. In some cases, a length of the information period is based on a subcarrier spacing and a base sampling frequency.

In some cases, the first signal includes a set of zero values at a start of the first signal, where the set of zero values is based on a number of sequences in the set of sequences and a length of the set of sequences. In some cases, a sequence of the set of sequences is a pseudorandom noise sequence or a Zadoff-Chu sequence.

The signal segmenter 915 may segment the first signal into a set of signal segments, where each signal segment corresponds to a respective symbol period of the set of symbol periods.

The first transform component 920 may apply a first transform operation to each signal segment of the set of signal segments to obtain a set of transformed signal segments. In some examples, the first transform component 920 may apply an FFT operation to at least one signal segment of the set of segments based on a length of the respective symbol period corresponding to the at least one signal segment.

In some examples, the first transform component 920 may determine a set of samples for each signal segment based on a subcarrier spacing and a base sampling frequency, where applying the first transform operation and the second transform operation are based on the set of samples.

In some cases, the first transform operation is based on a first matrix including an inverse DFT kernel, where an order of the first matrix corresponds to a length of the respective symbol period, based on a second matrix, where the second matrix is the first matrix with a set of columns corresponding to the bandwidth, and based on an identity matrix, where an order of the identity matrix corresponds to a length of a cyclic prefix of the respective symbol period.

The second transform component 925 may apply a second transform operation different from the first transform operation to each transformed signal segment to obtain a set of output signal segments. In some examples, the second transform component 925 may apply an IFFT operation to at least one transformed signal segment based on a length of the symbol period corresponding to the at least one transformed signal segment. In some cases, the set of transformed signal segments correspond to a frequency domain, and the set of output signal segments correspond to the time domain.

The signal generating component 930 may generate a second signal in the time domain based on obtaining the set of the output signal segments. In some examples, the signal generating component 930 may combine the set of output signal segments using a sequential ordering of the set of output signal segments that approximates the first signal using the set of output signal segments. The signal transmitter 935 may transmit the second signal to a second wireless device.

The frequency component determining component 940 may determine frequency components for a transformed signal segment of the set of transformed signal segments. In some examples, the frequency component determining component 940 may set a value for the frequency components outside of the bandwidth to a predetermined value, where applying the second transform operation is based on setting the value for the frequency components.

The MMSE estimate component 945 may determine MMSE estimate coefficients of at least one signal segment of the set of signal segments in the bandwidth, where applying the first transform operation is based on determining the MMSE estimate coefficients of the at least one signal segment. In some examples, the MMSE estimate component 945 may determine frequency components for at least one transformed signal segment in the bandwidth based on the MMSE estimate coefficients of the at least one signal segment, where applying the second transform operation is based on determining the frequency components for at least one transformed signal segment.

In some examples, the MMSE estimate component 945 may add at least one placeholder value to the MMSE estimate coefficients based on a length of the respective symbol period corresponding to the signal segment, where applying the second transform operation is based on adding the at least one placeholder value. In some examples, the MMSE estimate component 945 may derive a set of frequency components corresponding to the bandwidth using a preconfigured matrix that is based on the bandwidth and a length of the symbol period.

The cyclic prefix appending component 950 may append at least a portion of at least one cyclic prefix to at least one output signal segment of the set of output signal segments.

In some cases, a first length of a first cyclic prefix for a first output signal segment is different than a second length of a second cyclic prefix for a second output signal segment. In some examples, the cyclic prefix appending component 950 may append a portion of the first cyclic prefix having the first length to the first output signal segment of the set of output signal segments and a portion of the second cyclic prefix having the second length to the second output signal segment of the set of output signal segments.

The sequence identifier 955 may identify, at a first wireless device, a set of sequences including at least a first sequence. In some cases, the first sequence is a pseudorandom noise sequence or a Zadoff-Chu sequence.

The signal receiver 960 may receive, from a second wireless device, a first signal in a time domain, the first signal including a set of symbols spanning a bandwidth for a set of symbol periods. In some cases, the signal includes non-zero values for frequency components within the bandwidth and zero values for frequency components outside of the bandwidth.

The sample identifier 965 may identify a first set of samples corresponding to the first sequence in a first symbol period of the set of symbol periods of the first signal. In some examples, the sample identifier 965 may identify a second set of samples corresponding to the first sequence in a second symbol period subsequent to the first symbol period of the set of symbol periods of the first signal. In some examples, the sample identifier 965 may identify the first set of samples based on a cross-correlation of the first set of samples to the first sequence, and identify the second set of samples based on a cross-correlation of the second set of samples to the first sequence.

The sequence identifying component 970 may combine the first set of samples and the second set of samples to identify at least a portion of a second sequence which approximates the first sequence. In some cases, the sequence identifying component 970 may combine the first set of samples and the second set of samples to generate at least a portion of a second sequence which approximates the first sequence.

The symbol period identifying component 975 may identify an information period and a cyclic prefix period in a symbol period of the set of symbol periods, where the information period includes a first subset of samples and the cyclic prefix period includes a second subset of samples. In some examples, the symbol period identifying component 975 may identify a set of zero values at a start of a first symbol of the set of symbols, where the set of zero values is based on a number of sequences in the set of sequences and a length of the set of sequences.

Figure 10:
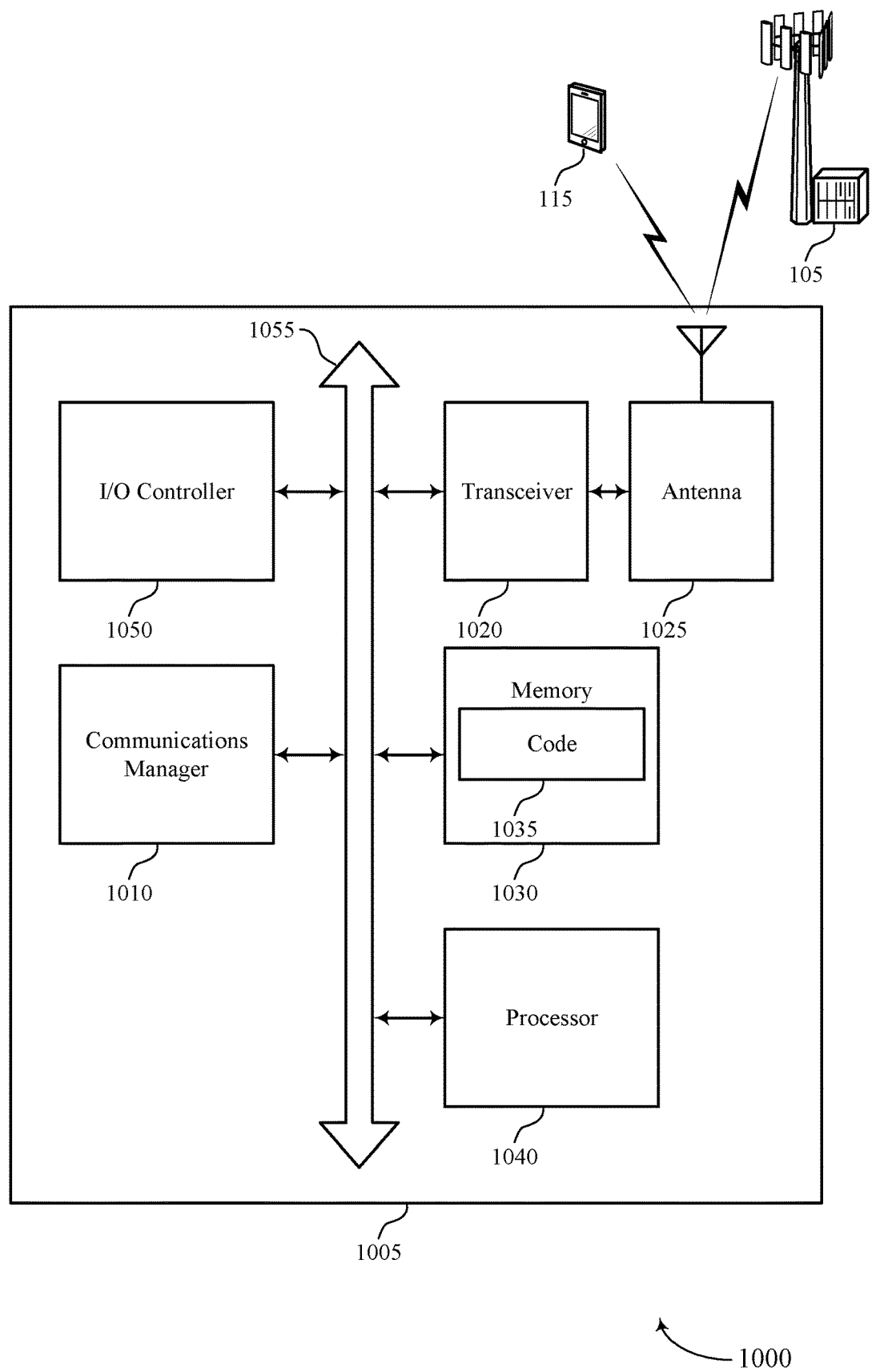
FIG. 10 shows a diagram of a system including a user equipment (UE) that supports signal generation for OFDM-based systems in accordance with aspects of the present disclosure.

FIG. 10 shows a diagram of a system 1000 including a device 1005 that supports signal generation for OFDM-based systems in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may identify, at a first wireless device, a first signal in a time domain, the first signal including a set of sequences spanning a bandwidth for a set of symbol periods, segment the first signal into a set of signal segments, where each signal segment corresponds to a respective symbol period of the set of symbol periods, apply a first transform operation to each signal segment of the set of signal segments to obtain a set of transformed signal segments, apply a second transform operation different from the first transform operation to each transformed signal segment to obtain a set of output signal segments, generate a second signal in the time domain based on obtaining the set of the output signal segments, and transmit the second signal to a second wireless device.

The communications manager 1010 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to identify at least a portion of a second sequence which approximates the first sequence.

The communications manager 1010 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to generate at least a portion of a second sequence which approximates the first sequence.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting signal generation for OFDM-based systems).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
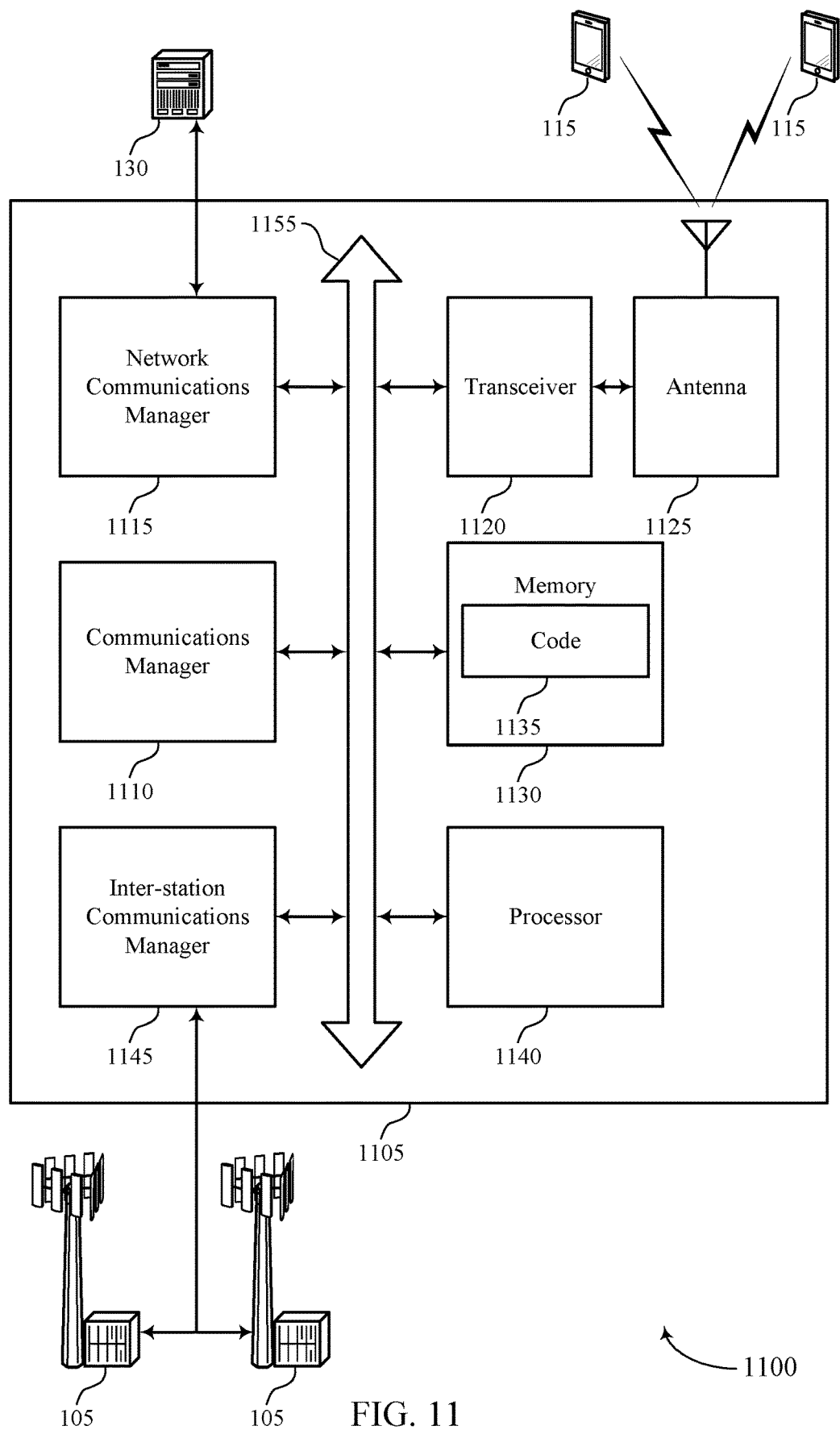
FIG. 11 shows a diagram of a system including a base station that supports signal generation for OFDM-based systems in accordance with aspects of the present disclosure.

FIG. 11 shows a diagram of a system 1100 including a device 1105 that supports signal generation for OFDM-based systems in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may identify, at a first wireless device, a first signal in a time domain, the first signal including a set of sequences spanning a bandwidth for a set of symbol periods, segment the first signal into a set of signal segments, where each signal segment corresponds to a respective symbol period of the set of symbol periods, apply a first transform operation to each signal segment of the set of signal segments to obtain a set of transformed signal segments, apply a second transform operation different from the first transform operation to each transformed signal segment to obtain a set of output signal segments, generate a second signal in the time domain based on obtaining the set of the output signal segments, and transmit the second signal to a second wireless device.

The communications manager 1110 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to identify at least a portion of a second sequence which approximates the first sequence.

The communications manager 1110 may also identify, at a first wireless device, a set of sequences including at least a first sequence, receive, from a second wireless device, a first signal in a time domain, the first signal including a set of symbols spanning a bandwidth for a set of symbol periods, identify a first set of samples corresponding to the first sequence in a first symbol period of the set of symbol periods of the first signal, identify a second set of samples corresponding to the first sequence in a second symbol period subsequent to the first symbol period of the set of symbol periods of the first signal, and combine the first set of samples and the second set of samples to generate at least a portion of a second sequence which approximates the first sequence.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting signal generation for OFDM-based systems).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communications network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
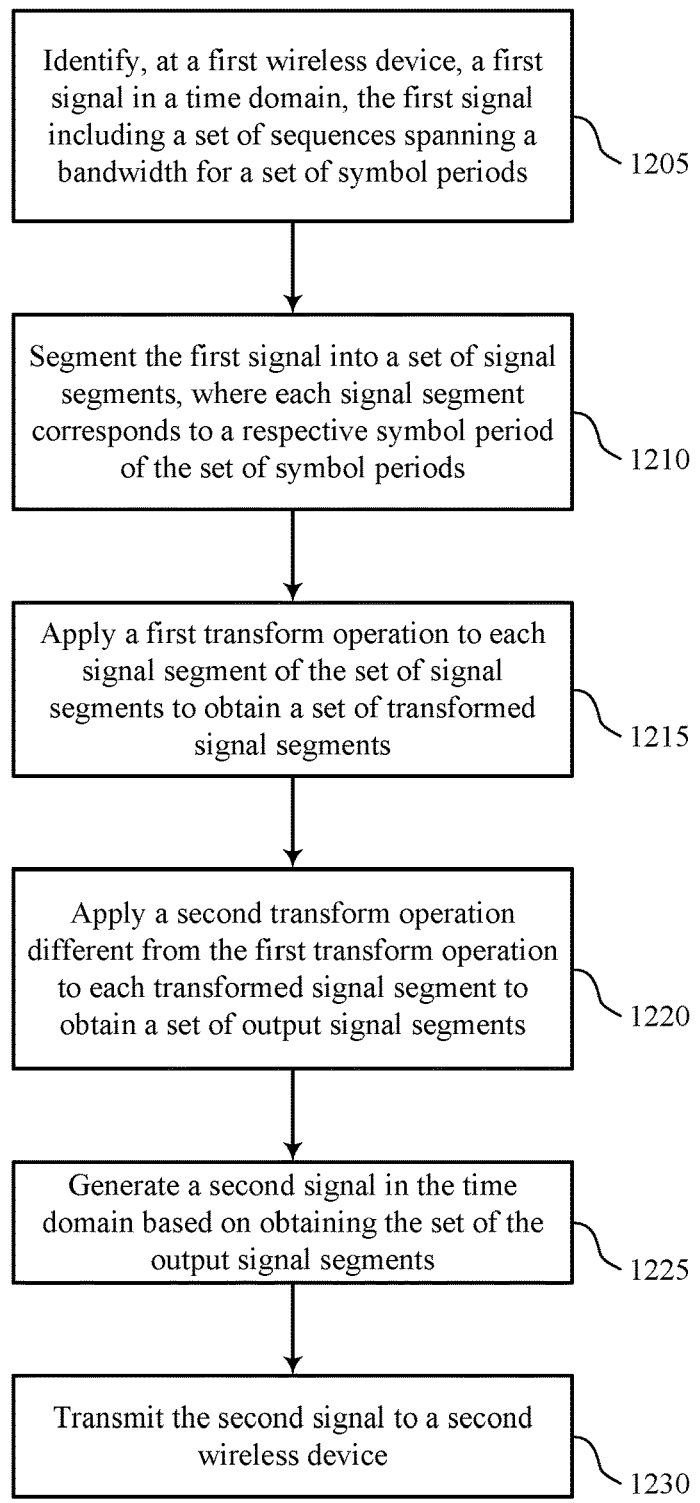
FIGS. 12 through 15 show flowcharts illustrating methods that support signal generation for OFDM-based systems in accordance with aspects of the present disclosure.

FIG. 12 shows a flowchart illustrating a method 1200 that supports signal generation for OFDM-based systems in accordance with aspects of the present disclosure. The operations of method 1200 may be implemented by a UE 115 or base station 105 or its components as described herein. For example, the operations of method 1200 may be performed by a communications manager as described with reference to FIGS. 7 to 11. In some examples, a UE 115 or base station 105 may execute a set of instructions to control the functional elements of the UE or base station to perform the functions described below. Additionally or alternatively, a UE or base station may perform aspects of the functions described below using special-purpose hardware.

At 1205, the UE 115 or base station 105 may identify, at a first wireless device, a first signal in a time domain, the first signal including a set of sequences spanning a bandwidth for a set of symbol periods. The operations of 1205 may be performed according to the methods described herein. In some examples, aspects of the operations of 1205 may be performed by a signal identifier as described with reference to FIGS. 7 to 11.

At 1210, the UE 115 or base station 105 may segment the first signal into a set of signal segments, where each signal segment corresponds to a respective symbol period of the set of symbol periods. The operations of 1210 may be performed according to the methods described herein. In some examples, aspects of the operations of 1210 may be performed by a signal segmenter as described with reference to FIGS. 7 to 11.

At 1215, the UE 115 or base station 105 may apply a first transform operation to each signal segment of the set of signal segments to obtain a set of transformed signal segments. The operations of 1215 may be performed according to the methods described herein. In some examples, aspects of the operations of 1215 may be performed by a first transform component as described with reference to FIGS. 7 to 11.

At 1220, the UE 115 or base station 105 may apply a second transform operation different from the first transform operation to each transformed signal segment to obtain a set of output signal segments. The operations of 1220 may be performed according to the methods described herein. In some examples, aspects of the operations of 1220 may be performed by a second transform component as described with reference to FIGS. 7 to 11.

At 1225, the UE 115 or base station 105 may generate a second signal in the time domain based on obtaining the set of the output signal segments. The operations of 1225 may be performed according to the methods described herein. In some examples, aspects of the operations of 1225 may be performed by a signal generating component as described with reference to FIGS. 7 to 11.

At 1230, the UE 115 or base station 105 may transmit the second signal to a second wireless device. The operations of 1230 may be performed according to the methods described herein. In some examples, aspects of the operations of 1230 may be performed by a signal transmitter as described with reference to FIGS. 7 to 11.

Figure 13:
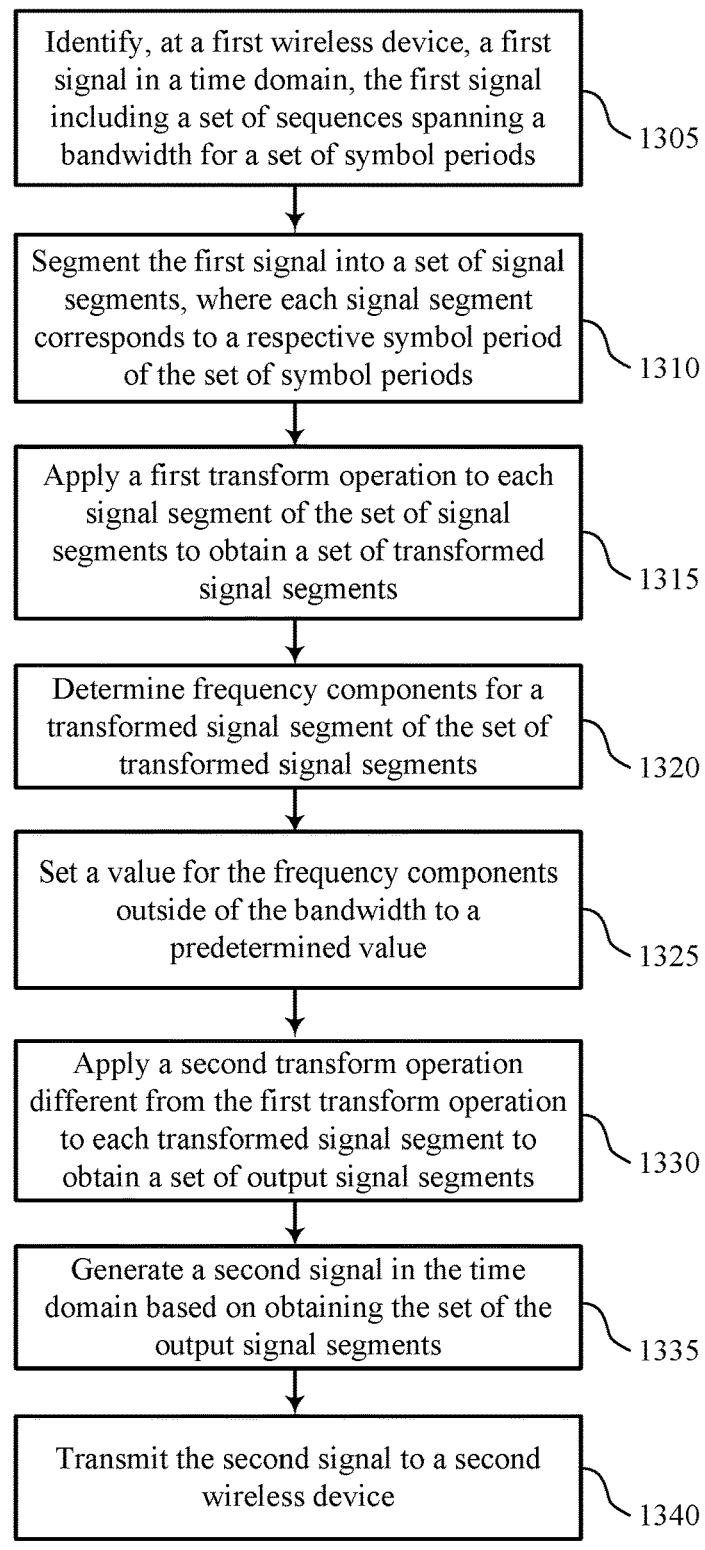

FIG. 13 shows a flowchart illustrating a method 1300 that supports signal generation for OFDM-based systems in accordance with aspects of the present disclosure. The operations of method 1300 may be implemented by a UE 115 or base station 105 or its components as described herein. For example, the operations of method 1300 may be performed by a communications manager as described with reference to FIGS. 7 to 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE 115 or base station 105 may identify, at a first wireless device, a first signal in a time domain, the first signal including a set of sequences spanning a bandwidth for a set of symbol periods. The operations of 1305 may be performed according to the methods described herein. In some examples, aspects of the operations of 1305 may be performed by a signal identifier as described with reference to FIGS. 7 to 11.

At 1310, the UE 115 or base station 105 may segment the first signal into a set of signal segments, where each signal segment corresponds to a respective symbol period of the set of symbol periods. The operations of 1310 may be performed according to the methods described herein. In some examples, aspects of the operations of 1310 may be performed by a signal segmenter as described with reference to FIGS. 7 to 11.

At 1315, the UE 115 or base station 105 may apply a first transform operation to each signal segment of the set of signal segments to obtain a set of transformed signal segments. The operations of 1315 may be performed according to the methods described herein. In some examples, aspects of the operations of 1315 may be performed by a first transform component as described with reference to FIGS. 7 to 11.

At 1320, the UE 115 or base station 105 may determine frequency components for a transformed signal segment of the set of transformed signal segments. The operations of 1320 may be performed according to the methods described herein. In some examples, aspects of the operations of 1320 may be performed by a frequency component determining component as described with reference to FIGS. 7 to 11.

At 1325, the UE 115 or base station 105 may set a value for the frequency components outside of the bandwidth to a predetermined value. The operations of 1325 may be performed according to the methods described herein. In some examples, aspects of the operations of 1325 may be performed by a frequency component determining component as described with reference to FIGS. 7 to 11.

At 1330, the UE 115 or base station 105 may apply a second transform operation different from the first transform operation to each transformed signal segment to obtain a set of output signal segments. In some cases, applying the second transform operation is based on setting the value for the frequency components. The operations of 1330 may be performed according to the methods described herein. In some examples, aspects of the operations of 1330 may be performed by a second transform component as described with reference to FIGS. 7 to 11.

At 1335, the UE 115 or base station 105 may generate a second signal in the time domain based on obtaining the set of the output signal segments. The operations of 1335 may be performed according to the methods described herein. In some examples, aspects of the operations of 1335 may be performed by a signal generating component as described with reference to FIGS. 7 to 11.

At 1340, the UE 115 or base station 105 may transmit the second signal to a second wireless device. The operations of 1340 may be performed according to the methods described herein. In some examples, aspects of the operations of 1340 may be performed by a signal transmitter as described with reference to FIGS. 7 to 11.

Figure 14:
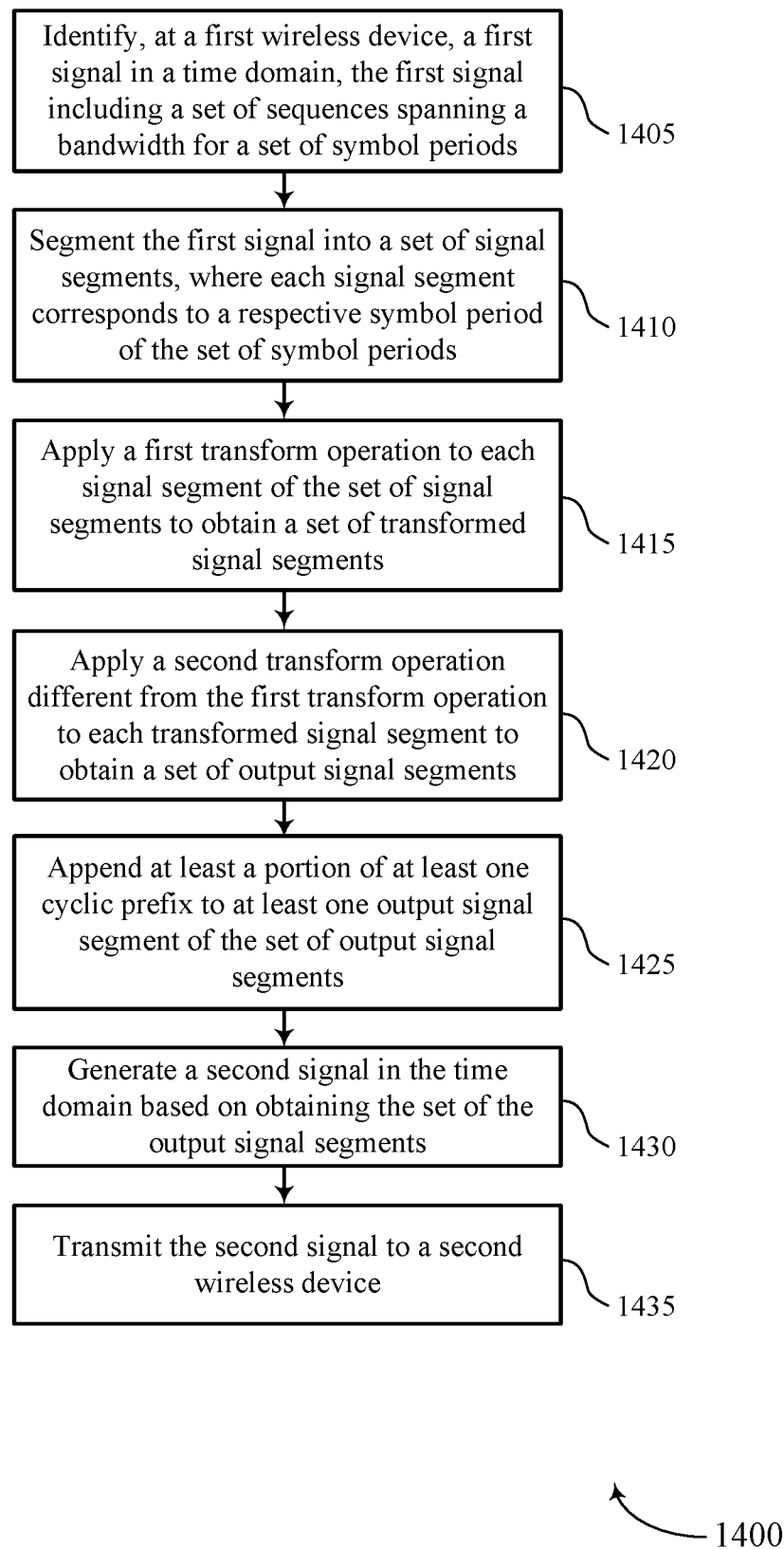

FIG. 14 shows a flowchart illustrating a method 1400 that supports signal generation for OFDM-based systems in accordance with aspects of the present disclosure. The operations of method 1400 may be implemented by a UE 115 or base station 105 or its components as described herein. For example, the operations of method 1400 may be performed by a communications manager as described with reference to FIGS. 7 to 11. In some examples, a UE 115 or base station 105 may execute a set of instructions to control the functional elements of the UE 115 or base station 105 to perform the functions described below. Additionally or alternatively, a UE 115 or base station 105 may perform aspects of the functions described below using special-purpose hardware.

At 1405, the UE 115 or base station 105 may identify, at a first wireless device, a first signal in a time domain, the first signal including a set of sequences spanning a bandwidth for a set of symbol periods. The operations of 1405 may be performed according to the methods described herein. In some examples, aspects of the operations of 1405 may be performed by a signal identifier as described with reference to FIGS. 7 to 11.

At 1410, the UE 115 or base station 105 may segment the first signal into a set of signal segments, where each signal segment corresponds to a respective symbol period of the set of symbol periods. The operations of 1410 may be performed according to the methods described herein. In some examples, aspects of the operations of 1410 may be performed by a signal segmenter as described with reference to FIGS. 7 to 11.

At 1415, the UE 115 or base station 105 may apply a first transform operation to each signal segment of the set of signal segments to obtain a set of transformed signal segments. The operations of 1415 may be performed according to the methods described herein. In some examples, aspects of the operations of 1415 may be performed by a first transform component as described with reference to FIGS. 7 to 11.

At 1420, the UE 115 or base station 105 may apply a second transform operation different from the first transform operation to each transformed signal segment to obtain a set of output signal segments. The operations of 1420 may be performed according to the methods described herein. In some examples, aspects of the operations of 1420 may be performed by a second transform component as described with reference to FIGS. 7 to 11.

At 1425, the UE 115 or base station 105 may append at least a portion of at least one cyclic prefix to at least one output signal segment of the set of output signal segments. The operations of 1425 may be performed according to the methods described herein. In some examples, aspects of the operations of 1425 may be performed by a cyclic prefix appending component as described with reference to FIGS. 7 to 11.

At 1430, the UE 115 or base station 105 may generate a second signal in the time domain based on obtaining the set of the output signal segments. The operations of 1430 may be performed according to the methods described herein. In some examples, aspects of the operations of 1430 may be performed by a signal generating component as described with reference to FIGS. 7 to 11.

At 1435, the UE 115 or base station 105 may transmit the second signal to a second wireless device. The operations of 1435 may be performed according to the methods described herein. In some examples, aspects of the operations of 1435 may be performed by a signal transmitter as described with reference to FIGS. 7 to 11.

Figure 15:
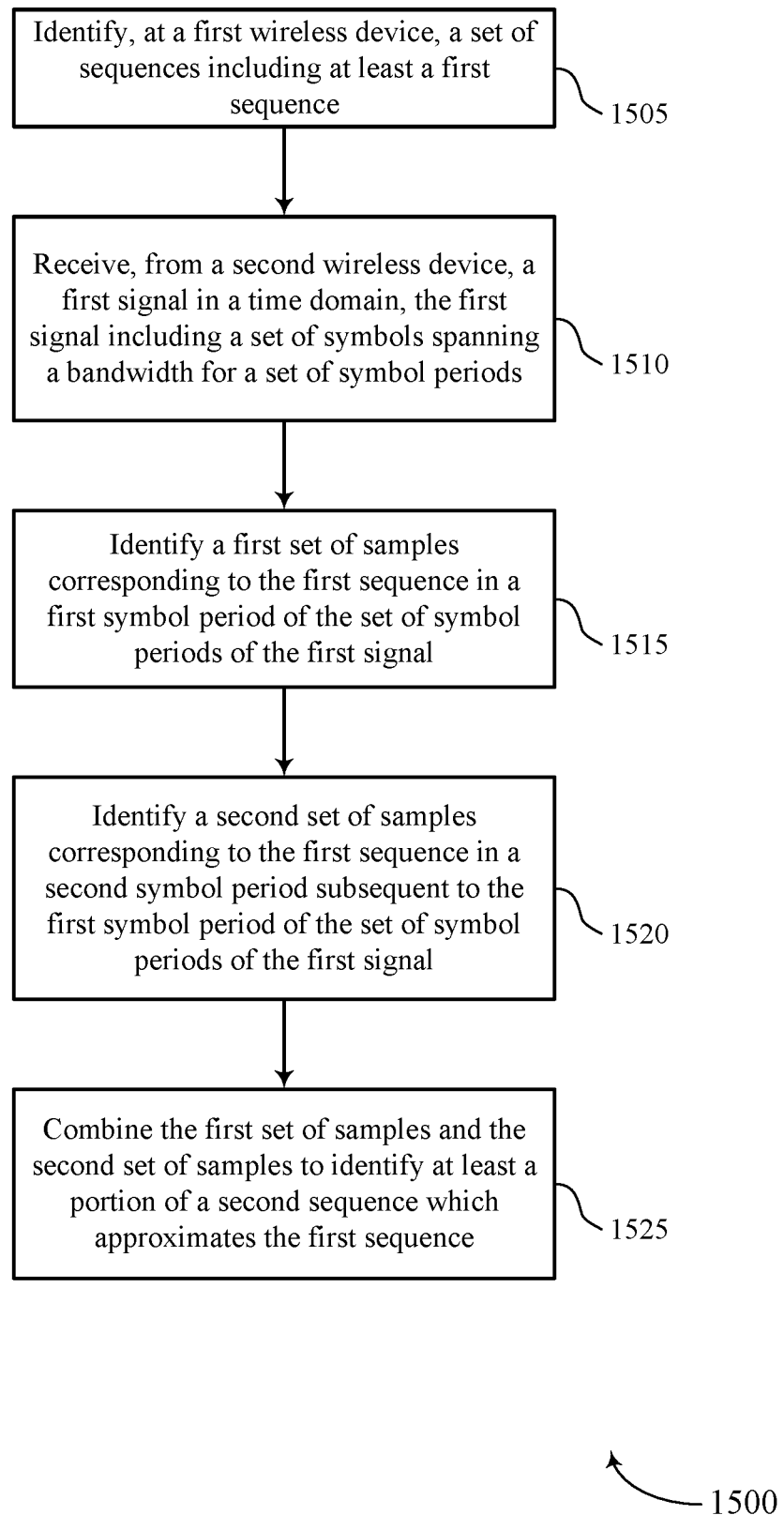

FIG. 15 shows a flowchart illustrating a method 1500 that supports signal generation for OFDM-based systems in accordance with aspects of the present disclosure. The operations of method 1500 may be implemented by a UE 115 or base station 105 or its components as described herein. For example, the operations of method 1500 may be performed by a communications manager as described with reference to FIGS. 7 to 11. In some examples, a UE 115 or base station 105 may execute a set of instructions to control the functional elements of the UE 115 or base station 105 to perform the functions described below. Additionally or alternatively, a UE 115 or base station 105 may perform aspects of the functions described below using special-purpose hardware.

At 1505, the UE 115 or base station 105 may identify, at a first wireless device, a set of sequences including at least a first sequence. The operations of 1505 may be performed according to the methods described herein. In some examples, aspects of the operations of 1505 may be performed by a sequence identifier as described with reference to FIGS. 7 to 11.

At 1510, the UE 115 or base station 105 may receive, from a second wireless device, a first signal in a time domain, the first signal including a set of symbols spanning a bandwidth for a set of symbol periods. The operations of 1510 may be performed according to the methods described herein. In some examples, aspects of the operations of 1510 may be performed by a signal receiver as described with reference to FIGS. 7 to 11.

At 1515, the UE 115 or base station 105 may identify a first set of samples corresponding to the first sequence in a first symbol period of the set of symbol periods of the first signal. The operations of 1515 may be performed according to the methods described herein. In some examples, aspects of the operations of 1515 may be performed by a sample identifier as described with reference to FIGS. 7 to 11.

At 1520, the UE 115 or base station 105 may identify a second set of samples corresponding to the first sequence in a second symbol period subsequent to the first symbol period of the set of symbol periods of the first signal. The operations of 1520 may be performed according to the methods described herein. In some examples, aspects of the operations of 1520 may be performed by a sample identifier as described with reference to FIGS. 7 to 11.

At 1525, the UE 115 or base station 105 may combine the first set of samples and the second set of samples to identify at least a portion of a second sequence which approximates the first sequence. In some cases, the UE 115 or base station 105 may combine the first set of samples and the second set of samples to generate at least a portion of a second sequence which approximates the first sequence. The operations of 1525 may be performed according to the methods described herein. In some examples, aspects of the operations of 1525 may be performed by a sequence identifying component as described with reference to FIGS. 7 to 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    identifying, at a first wireless device, a first signal in a time domain, the first signal comprising a plurality of sequences spanning a bandwidth for a plurality of symbol periods;
    segmenting the first signal into a plurality of signal segments, wherein each signal segment corresponds to a respective symbol period of the plurality of symbol periods;
    applying a first transform operation to each signal segment of the plurality of signal segments to obtain a plurality of transformed signal segments;
    restricting frequency components of the plurality of transformed signal segments to the bandwidth;
    applying a second transform operation different from the first transform operation to each transformed signal segment to obtain a plurality of output signal segments;
    generating a second signal in the time domain based at least in part on obtaining the plurality of the output signal segments; and
    transmitting the second signal to a second wireless device.

2. The method of claim 1, further comprising:
    determining frequency components for a transformed signal segment of the plurality of transformed signal segments; and
    setting a value for the frequency components outside of the bandwidth to a predetermined value, wherein applying the second transform operation is based at least in part on setting the value for the frequency components.

3. The method of claim 1, wherein applying the first transform operation comprises:
    applying a fast Fourier transform (FFT) operation to at least one signal segment of the plurality of segments based at least in part on a length of the respective symbol period corresponding to the at least one signal segment.

4. The method of claim 1, further comprising:
    determining minimum mean square error (MMSE) estimate coefficients of at least one signal segment of the plurality of signal segments in the bandwidth, wherein applying the first transform operation is based at least in part on determining the MMSE estimate coefficients of the at least one signal segment; and
    determining frequency components for at least one transformed signal segment in the bandwidth based at least in part on the MMSE estimate coefficients of the at least one signal segment, wherein applying the second transform operation is based at least in part on determining the frequency components for at least one transformed signal segment.

5. The method of claim 4, further comprising:
    adding at least one placeholder value to the MMSE estimate coefficients based at least in part on a length of the respective symbol period corresponding to the signal segment, wherein applying the second transform operation is based at least in part on adding the at least one placeholder value.

6. The method of claim 4, wherein determining the MMSE estimate coefficients further comprises:
    deriving a plurality of frequency components corresponding to the bandwidth using a preconfigured matrix that is based at least in part on the bandwidth and a length of the symbol period.

7. The method of claim 1, wherein applying the second transform operation comprises:
    applying an inverse fast Fourier transform (IFFT) operation to at least one transformed signal segment based at least in part on a length of the symbol period corresponding to the at least one transformed signal segment.

8. The method of claim 1, further comprising:
    appending at least a portion of at least one cyclic prefix to at least one output signal segment of the plurality of output signal segments.

9. The method of claim 8, wherein a first length of a first cyclic prefix for a first output signal segment is different than a second length of a second cyclic prefix for a second output signal segment, and wherein appending the at least a portion of the at least one cyclic prefix to the at least one output signal segment of the plurality of output signal segments comprises:
    appending a portion of the first cyclic prefix having the first length to the first output signal segment of the plurality of output signal segments and a portion of the second cyclic prefix having the second length to the second output signal segment of the plurality of output signal segments.

10. The method of claim 1, wherein generating the second signal in the time domain further comprises:
    combining the plurality of output signal segments using a sequential ordering of the plurality of output signal segments that approximates the first signal using the plurality of output signal segments.

11. The method of claim 1, further comprising:
    determining a set of samples for each signal segment based at least in part on a subcarrier spacing and a base sampling frequency, wherein applying the first transform operation and the second transform operation are based at least in part on the set of samples.

12. The method of claim 1, wherein a symbol period of the plurality of symbol periods comprises an information period and a cyclic prefix period.

13. The method of claim 12, wherein a length of the information period is based at least in part on a subcarrier spacing and a base sampling frequency.

14. The method of claim 1, wherein the first signal comprises a set of zero values at a start of the first signal, wherein the set of zero values is based at least in part on a number of sequences in the plurality of sequences and a length of the plurality of sequences.

15. The method of claim 1, wherein the plurality of transformed signal segments corresponds to a frequency domain, and the plurality of output signal segments corresponds to the time domain.

16. The method of claim 1, wherein the first transform operation is based at least in part on:
   a first matrix comprising an inverse discrete Fourier transform (DFT) kernel, wherein an order of the first matrix corresponds to a length of the respective symbol period;
   a second matrix, wherein the second matrix is the first matrix with only a set of columns corresponding to the bandwidth; and
   an identity matrix, wherein an order of the identity matrix corresponds to a length of a cyclic prefix of the respective symbol period.

17. The method of claim 1, wherein a sequence of the plurality of sequences is a pseudorandom noise sequence or a Zadoff-Chu sequence.

18. An apparatus for wireless communications, comprising:
   a processor,
   memory in electronic communication with the processor; and
   instructions stored in the memory and executable by the processor to cause the apparatus to:
      identify, at a first wireless device, a first signal in a time domain, the first signal comprising a plurality of sequences spanning a bandwidth for a plurality of symbol periods;
      segment the first signal into a plurality of signal segments, wherein each signal segment corresponds to a respective symbol period of the plurality of symbol periods;
      apply a first transform operation to each signal segment of the plurality of signal segments to obtain a plurality of transformed signal segments;
      restrict frequency components of the plurality of transformed signal segments to the bandwidth;
      apply a second transform operation different from the first transform operation to each transformed signal segment to obtain a plurality of output signal segments;
      generate a second signal in the time domain based at least in part on obtaining the plurality of the output signal segments; and
      transmit the second signal to a second wireless device.

19. The apparatus of claim 18, wherein the instructions are further executable by the processor to cause the apparatus to:
   determine frequency components for a transformed signal segment of the plurality of transformed signal segments; and
   set a value for the frequency components outside of the bandwidth to a predetermined value, wherein applying the second transform operation is based at least in part on setting the value for the frequency components.

20. The apparatus of claim 18, wherein the instructions to apply the first transform operation are executable by the processor to cause the apparatus to:
   apply a fast Fourier transform (FFT) operation to at least one signal segment of the plurality of segments based at least in part on a length of the respective symbol period corresponding to the at least one signal segment.

21. The apparatus of claim 18, wherein the instructions are further executable by the processor to cause the apparatus to:
   determine minimum mean square error (MMSE) estimate coefficients of at least one signal segment of the plurality of signal segments in the bandwidth, wherein applying the first transform operation is based at least in part on determining the MMSE estimate coefficients of the at least one signal segment; and
   determine frequency components for at least one transformed signal segment in the bandwidth based at least in part on the MMSE estimate coefficients of the at least one signal segment, wherein applying the second transform operation is based at least in part on determining the frequency components for at least one transformed signal segment.

22. The apparatus of claim 18, wherein the instructions to apply the second transform operation are executable by the processor to cause the apparatus to:
   apply an inverse fast Fourier transform (IFFT) operation to at least one transformed signal segment based at least in part on a length of the symbol period corresponding to the at least one transformed signal segment.

23. The apparatus of claim 18, wherein the instructions to generate the second signal in the time domain further are executable by the processor to cause the apparatus to:
   combine the plurality of output signal segments using a sequential ordering of the plurality of output signal segments that approximates the first signal using the plurality of output signal segments.

24. The apparatus of claim 18, wherein the instructions to apply the second transform operation are executable by the processor to cause the apparatus to:
   apply an inverse fast Fourier transform (IFFT) operation to at least one transformed signal segment based at least in part on a length of the symbol period corresponding to the at least one transformed signal segment.

25. The apparatus of claim 18, wherein the instructions are further executable by the processor to cause the apparatus to:
   append at least a portion of at least one cyclic prefix to at least one output signal segment of the plurality of output signal segments.

26. The apparatus of claim 25, wherein a first length of a first cyclic prefix for a first output signal segment is different than a second length of a second cyclic prefix for a second output signal segment, and wherein the instructions are further executable by the processor to cause the apparatus to:
   append a portion of the first cyclic prefix having the first length to the first output signal segment of the plurality of output signal segments and a portion of the second cyclic prefix having the second length to the second output signal segment of the plurality of output signal segments.

27. The apparatus of claim 18, wherein the instructions to generate the second signal in the time domain further are executable by the processor to cause the apparatus to:
   combine the plurality of output signal segments using a sequential ordering of the plurality of output signal segments that approximates the first signal using the plurality of output signal segments.

28. The apparatus of claim 18, wherein the instructions are further executable by the processor to cause the apparatus to:

determine a set of samples for each signal segment based at least in part on a subcarrier spacing and a base sampling frequency, wherein applying the first transform operation and the second transform operation are based at least in part on the set of samples.

29. An apparatus for wireless communications, comprising:
- means for identifying, at a first wireless device, a first signal in a time domain, the first signal comprising a plurality of sequences spanning a bandwidth for a plurality of symbol periods;
- means for segmenting the first signal into a plurality of signal segments, wherein each signal segment corresponds to a respective symbol period of the plurality of symbol periods;
- means for applying a first transform operation to each signal segment of the plurality of signal segments to obtain a plurality of transformed signal segments;
- means for restricting frequency components of the plurality of transformed signal segments to the bandwidth;
- means for applying a second transform operation different from the first transform operation to each transformed signal segment to obtain a plurality of output signal segments;
- means for generating a second signal in the time domain based at least in part on obtaining the plurality of the output signal segments; and
- means for transmitting the second signal to a second wireless device.

30. A non-transitory computer-readable medium storing code for wireless communications, the code comprising instructions executable by a processor to:
- identify, at a first wireless device, a first signal in a time domain, the first signal comprising a plurality of sequences spanning a bandwidth for a plurality of symbol periods;
- segment the first signal into a plurality of signal segments, wherein each signal segment corresponds to a respective symbol period of the plurality of symbol periods;
- apply a first transform operation to each signal segment of the plurality of signal segments to obtain a plurality of transformed signal segments;
- restrict frequency components of the plurality of transformed signal segments to the bandwidth;
- apply a second transform operation different from the first transform operation to each transformed signal segment to obtain a plurality of output signal segments;
- generate a second signal in the time domain based at least in part on obtaining the plurality of the output signal segments; and
- transmit the second signal to a second wireless device.

* * * * *